US 011505107B2

(12) United States Patent
Leonard

(10) Patent No.: US 11,505,107 B2
(45) Date of Patent: Nov. 22, 2022

(54) VEHICLE-MOUNTED HOIST SYSTEMS AND METHODS

(71) Applicant: Ralph L. Leonard, North Charleston, SC (US)

(72) Inventor: Ralph L. Leonard, North Charleston, SC (US)

(*) Notice: Subject to any disclaimer, the term of this patent is extended or adjusted under 35 U.S.C. 154(b) by 0 days.

(21) Appl. No.: 17/377,276

(22) Filed: Jul. 15, 2021

(65) Prior Publication Data

US 2021/0339670 A1 Nov. 4, 2021

Related U.S. Application Data

(62) Division of application No. 16/806,136, filed on Mar. 2, 2020, now Pat. No. 11,130,435.

(51) Int. Cl.
*B60P 1/54* (2006.01)
*F16H 1/16* (2006.01)

(52) U.S. Cl.
CPC .......... *B60P 1/5419* (2013.01); *B60P 1/5414* (2013.01); *F16H 1/16* (2013.01)

(58) Field of Classification Search
CPC ............................ B60P 1/5414; B60P 1/5428
See application file for complete search history.

(56) References Cited

U.S. PATENT DOCUMENTS

| 2,967,635 | A | 1/1961 | Barnett |
| 3,139,203 | A | 6/1964 | Borger |
| 3,215,294 | A | 11/1965 | Salamin |
| 3,596,788 | A | 8/1971 | Willie et al. |
| 3,608,759 | A | 9/1971 | Arvada et al. |
| 3,720,334 | A | 3/1973 | Permut et al. |
| 3,836,024 | A | 9/1974 | Mantino |
| 3,927,779 | A | 12/1975 | Johnson |
| 3,952,893 | A | 4/1976 | Kolesar |
| 4,134,509 | A | 1/1979 | Clement |
| 4,139,110 | A | 2/1979 | Roberts |
| 4,272,218 | A | 1/1981 | Carter |
| 4,659,276 | A | 4/1987 | Billett |
| 4,700,851 | A | 10/1987 | Reeve et al. |
| 4,948,024 | A | 8/1990 | Warner et al. |

(Continued)

OTHER PUBLICATIONS

Non-Final Office Action dated Jul. 7, 2022, for U.S. Appl. No. 17/711,108.

(Continued)

*Primary Examiner* — Jonathan Snelting
(74) *Attorney, Agent, or Firm* — Nelson Mullins Riley & Scarborough LLP

(57) ABSTRACT

Lift assemblies and methods of operating same. A lift assembly for a vehicle includes at least one support member having a longitudinal axis lying on a plane and which is configured for attachment to the vehicle. A mast having a proximal end, a distal end, and a mast axis is pivotably coupled with the at least one support member at the mast proximal end. At least one gear arrangement is coupled between the at least one support member and the mast proximal end. The mast is pivotable relative to the at least one support member about an axis parallel with the plane through an angular displacement greater than 90 degrees. A boom is pivotably coupled with the mast proximate the mast distal end, and a first lift line is coupled with the boom.

11 Claims, 16 Drawing Sheets

(56) References Cited

U.S. PATENT DOCUMENTS

| | | |
|---|---|---|
| 4,953,757 A | 9/1990 | Stevens et al. |
| 5,346,355 A | 9/1994 | Riemer |
| 5,360,151 A | 11/1994 | Fine |
| 5,423,650 A | 6/1995 | Zerbst et al. |
| 5,460,472 A | 10/1995 | Bamber |
| 5,505,579 A | 4/1996 | Ray et al. |
| 5,709,521 A | 1/1998 | Glass |
| 5,827,036 A | 10/1998 | Steffes et al. |
| 5,853,282 A | 12/1998 | Bechler et al. |
| 5,904,463 A | 5/1999 | Christensen |
| 5,975,832 A | 11/1999 | Winkler |
| 6,547,507 B1 | 4/2003 | Gest et al. |
| 6,634,529 B2 | 10/2003 | Choiniere et al. |
| 6,688,836 B2 | 2/2004 | Gourand |
| 7,377,740 B2 | 5/2008 | Panzarella et al. |
| 8,844,738 B2 * | 9/2014 | Thompson .............. B66C 23/48 212/294 |
| 9,290,130 B2 | 3/2016 | Buller |
| 9,346,409 B2 | 5/2016 | Pfaeffli |
| 9,630,816 B1 | 4/2017 | Napieralski et al. |
| 9,758,106 B2 | 9/2017 | Zimmer |
| 9,937,088 B2 | 4/2018 | Guertler et al. |
| 9,975,740 B2 | 5/2018 | McVaugh |
| 10,040,402 B1 | 8/2018 | Brusselback |
| 10,046,711 B2 | 8/2018 | Zimmer |
| 10,246,025 B1 | 4/2019 | Knigge |
| 10,343,581 B1 | 7/2019 | Leonard |
| 10,421,653 B2 * | 9/2019 | Poczciwinski ............ B66C 1/14 |
| 10,773,630 B1 | 9/2020 | Thompson |
| 2003/0039535 A1 | 2/2003 | Gourand |
| 2007/0007316 A1 | 1/2007 | Witczak |
| 2008/0035688 A1 | 2/2008 | Malone |
| 2010/0111661 A1 | 5/2010 | Svanda |
| 2011/0024472 A1 | 2/2011 | Thompson et al. |
| 2013/0315693 A1 | 11/2013 | Diverdi |
| 2016/0001832 A1 | 1/2016 | Beiler |
| 2016/0023586 A1 | 1/2016 | Potticary et al. |
| 2016/0280114 A1 | 9/2016 | Baxter, Jr. |
| 2016/0362281 A1 | 12/2016 | McVaugh |
| 2017/0120833 A1 | 5/2017 | Rudnicki |
| 2018/0050622 A1 | 2/2018 | Roberts et al. |
| 2018/0162288 A1 | 6/2018 | Sautter et al. |
| 2018/0264983 A1 | 9/2018 | Lin et al. |
| 2018/0281692 A1 | 10/2018 | Fitfield |
| 2019/0241127 A1 | 8/2019 | Schweitzer et al. |
| 2020/0180515 A1 | 6/2020 | Dimmen et al. |
| 2020/0406830 A1 | 12/2020 | Owen et al. |
| 2021/0206323 A1 | 7/2021 | Carbone |
| 2021/0276493 A1 | 9/2021 | Neill et al. |
| 2022/0176883 A1 | 6/2022 | Pilkington |

OTHER PUBLICATIONS

Non-Final Office Action dated May 25, 2022, for U.S. Appl. No. 17/711,103.

* cited by examiner

VEHICLE-MOUNTED HOIST SYSTEMS AND METHODS

PRIORITY CLAIM

This application is a divisional application of co-pending U.S. application Ser. No. 16/806,136, entitled "Vehicle-Mounted Hoist Systems and Methods," filed on Mar. 2, 2020, which is relied upon and incorporated by reference herein in its entirety for all purposes.

TECHNICAL FIELD

Embodiments of the present invention generally relate to systems, assemblies, and associated methods for lifting and lowering objects to be secured, stored, and/or transported the exterior of a vehicle.

BACKGROUND

It is often necessary or desirable to secure and transport various objects on a roof of a vehicle. Such objects can include, among others, luggage, recreational equipment, furniture, and other items that may not fit in the vehicle's interior. Various systems are known for securing and transporting such objects. For example, the object(s), or a container in which the object(s) will be stored, can be attached to a roof rack that is mounted to the roof of the vehicle.

The foregoing discussion is intended only to illustrate various aspects of the related art in the field of the invention at the time, and should not be taken as a disavowal of claim scope.

SUMMARY

Although various systems are known for securing and transporting objects on the roof of a vehicle, it is often difficult to lift such objects onto and/or off of the vehicle roof in the first place. For instance, objects to be transported can be large, heavy, and otherwise unwieldy, such that a single or multiple individuals cannot easily lift the objects onto the vehicle's roof. Further, the roofs of many modern vehicles are well above the height of an average adult human, making lifting more challenging. These challenges are only exacerbated for individuals with disabilities, such as those who need the assistance of a wheelchair or who may lack upper body strength or mobility.

It is known to mount a hoist device on the roof of a vehicle for lifting and lowering objects onto the vehicle. However, known hoist devices suffer from a number of drawbacks. For example, to safely lift and lower objects from a vehicle's roof, a hoist device's boom must swing along a level plane. Where a vehicle is on a non-level surface, or when the hoist device is mounted to the vehicle's roof or roof rack in a non-level manner, a lifting boom may swing unpredictably and in the downward-facing direction under the force of gravity. This may be dangerous to users and impractical. Known devices do not provide any mechanism for leveling a lift assembly that is coupled with a vehicle that is disposed on a non-level surface. Further, and also by way of example, known hoist devices typically are manually actuated and are placed on a vehicle's roof, and as such they are not accessible to or operable by users with disabilities that impair their reach, strength, or coordination. Moreover, known devices are not constructed in a robust enough reduce the risk of material and structural fatigue. Similarly, known hoist devices do not adequately provide safety mechanisms to prevent a hoisted object from falling in the event a user becomes tired (in the case of manual actuation) or in the event of a power failure (in the case of automatic actuation). In contrast, embodiments of the present invention provide lift assemblies that can be attached to a vehicle (e.g., to a vehicle's roof or roof rack) and methods for operating such lift assemblies that overcome these and other problems with known devices.

According to one embodiment, the present invention comprises a lift assembly for a vehicle. The lift assembly comprises at least one support member having a longitudinal axis lying on a plane, and the at least one support member is configured for attachment to the vehicle. A mast having a proximal end, a distal end, and a mast axis is pivotably coupled with the at least one support member at the mast proximal end. At least one gear arrangement is coupled between the at least one support member and the mast proximal end. The mast is pivotable relative to the at least one support member about an axis parallel with the plane through an angular displacement greater than 90 degrees. A boom is pivotably coupled with the mast proximate the mast distal end, and a first lift line is coupled with the boom.

According to yet another embodiment, the present invention comprises a method of operating a lift assembly for a vehicle. The method comprises providing a lift assembly comprising at least one support member, the at least one support member having a longitudinal axis; a mast having a proximal end and a distal end, the mast having a mast axis, wherein the mast is pivotably coupled with the at least one support member at the mast proximal end via at least one first gear; a boom pivotably coupled with the mast proximate the mast distal end; and a lift line coupled with the boom. Further, the method comprises coupling the lift assembly with a roof rack of the vehicle. Also, the method comprises turning the at least one first gear to cause the mast to pivot from a first position, at which the mast axis and the longitudinal axis extend along parallel planes, to a second position, at which the mast axis extends along a plane that is disposed at an angle to the plane along which the longitudinal axis extends, wherein the angle exceeds 90 degrees.

According to a further embodiment, the present invention comprises a method of operating a lift assembly for a vehicle. The method comprises providing a lift assembly comprising at least one support member; a plurality of jacks coupled with the at least one support member; a mast having a proximal end and a distal end, wherein the mast is pivotably coupled with the at least one support member at the mast proximal end via at least one gear; a boom pivotably coupled with the mast proximate the mast distal end; and a lift line coupled with the boom. The method also comprises coupling the lift assembly with a roof rack of the vehicle such that the plurality of jacks are disposed between the roof rack and the at least one support member. Further, the method comprises actuating at least one of the plurality of jacks to level the at least one support member relative to a horizontal plane. Additionally, the method comprises turning the at least one gear to level the mast relative to a vertical plane disposed at a right angle to the horizontal plane.

BRIEF DESCRIPTION OF THE DRAWINGS

Figure 1:
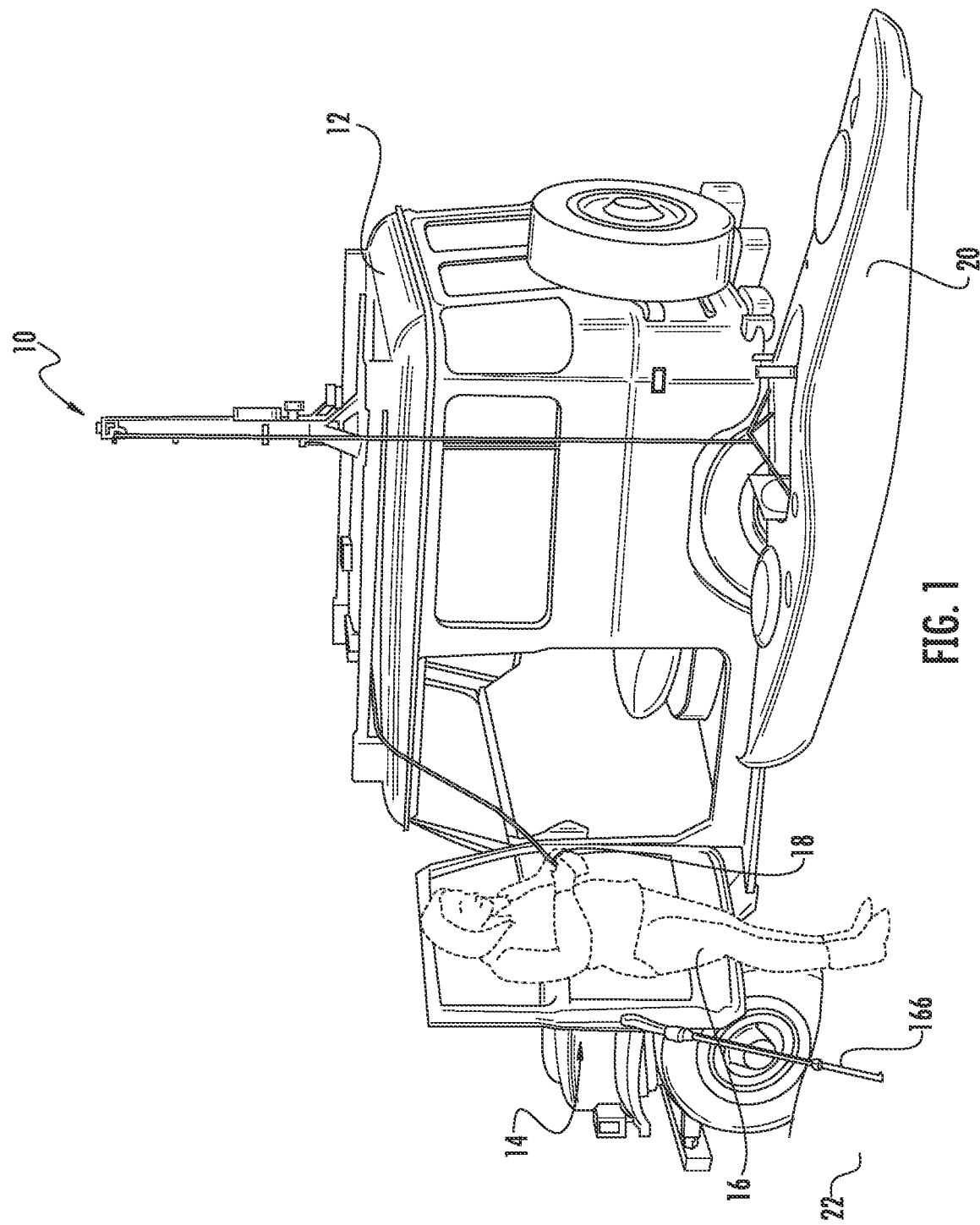
Figure 2:
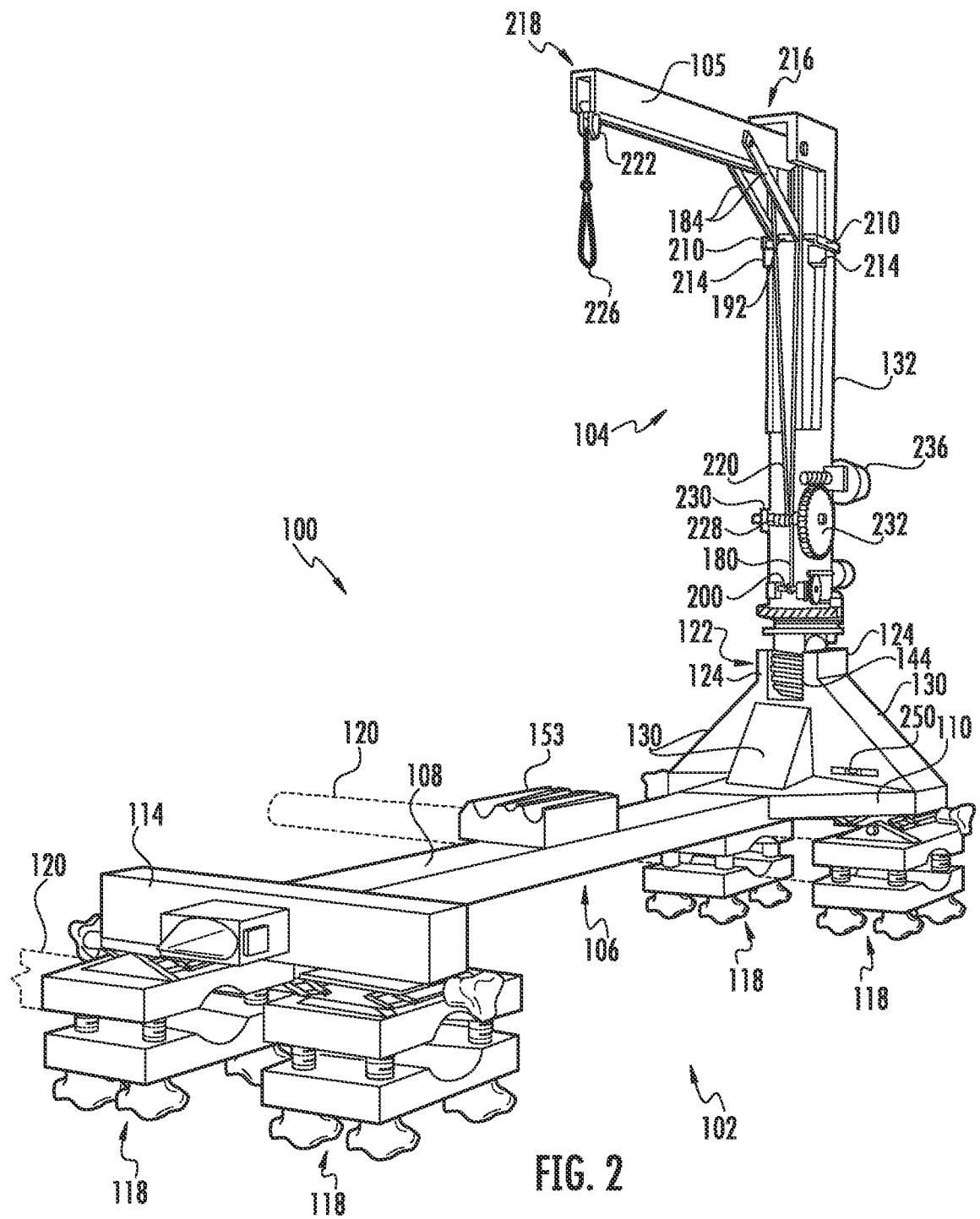
Figure 3:
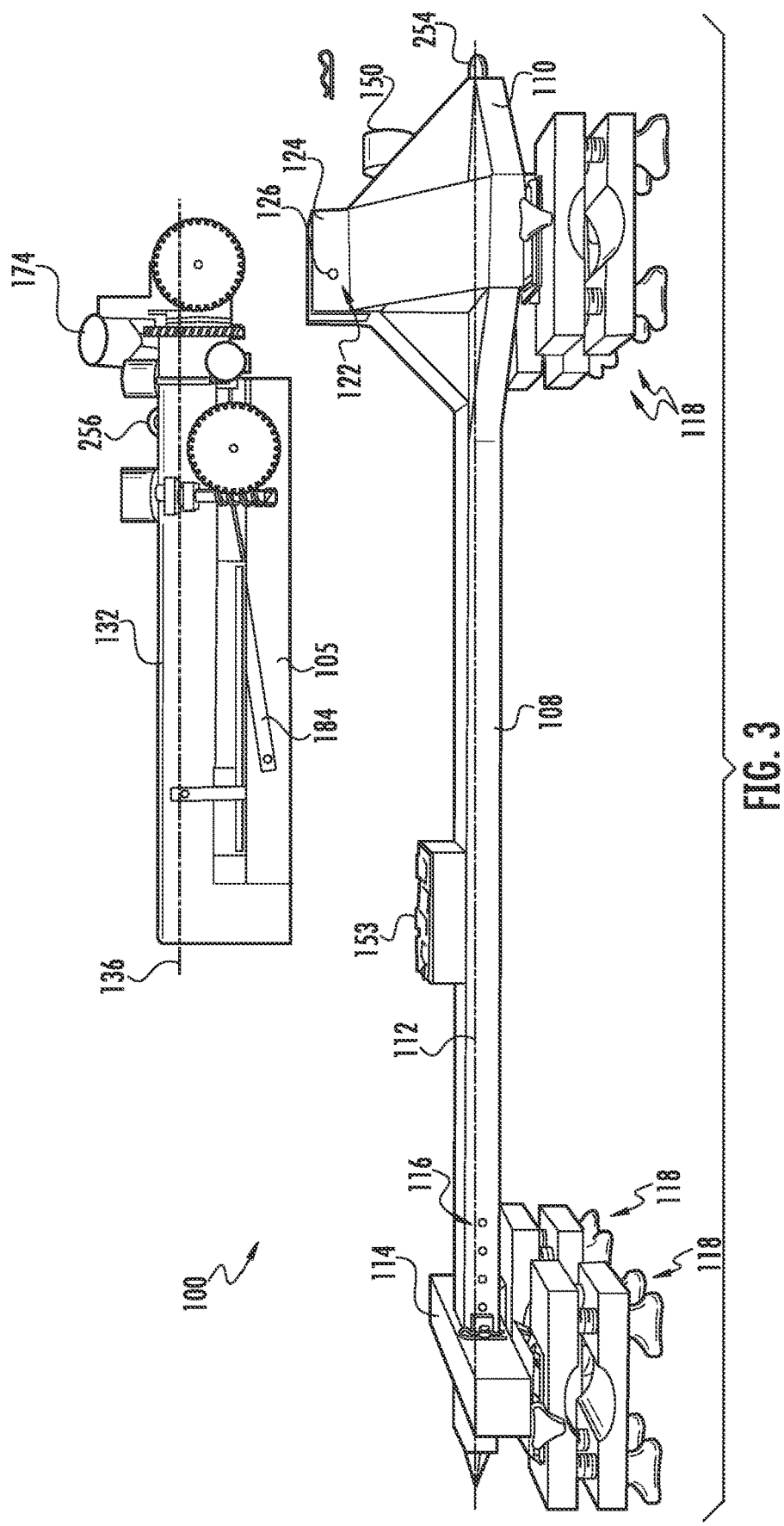
Figure 4:
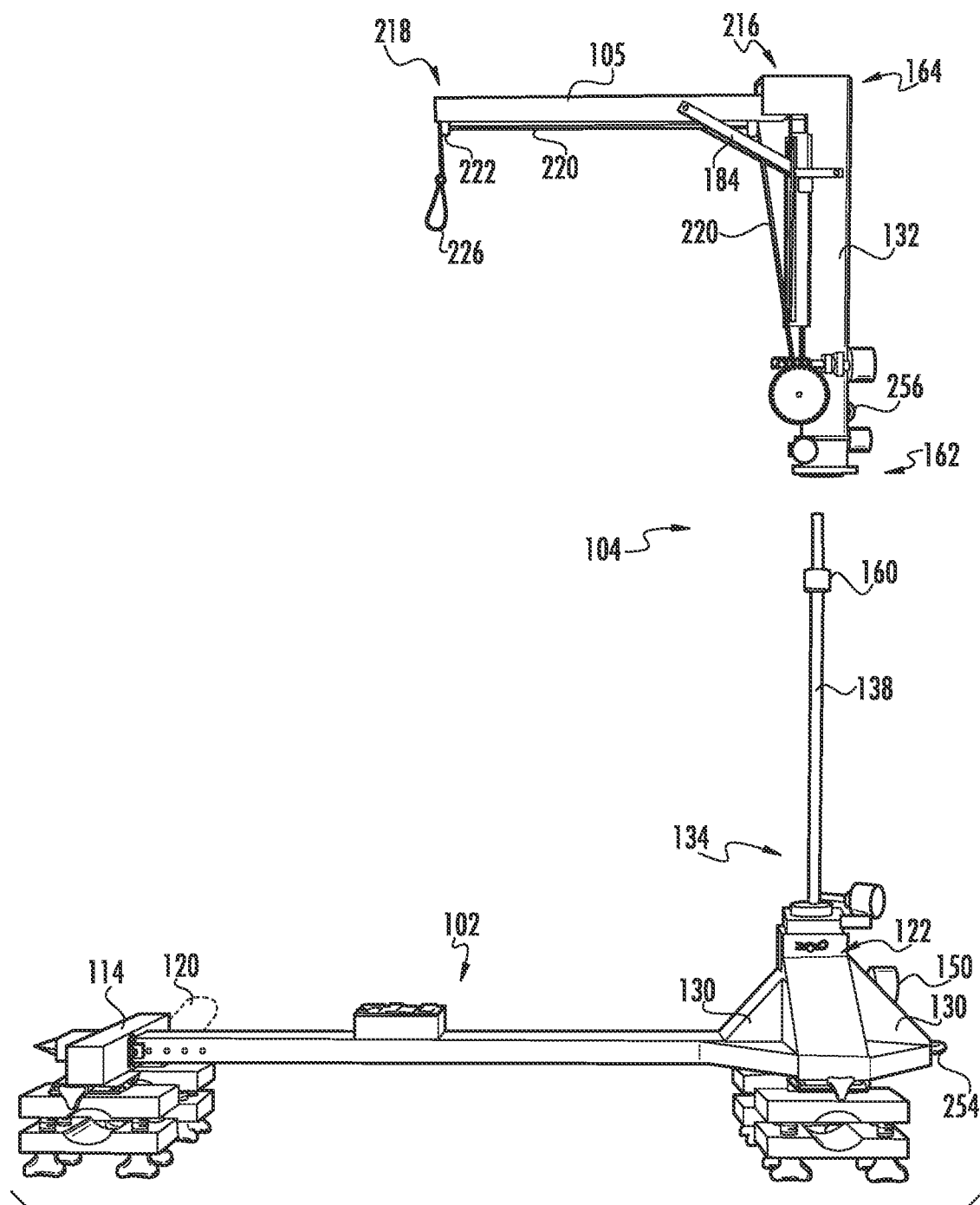
Figure 5:
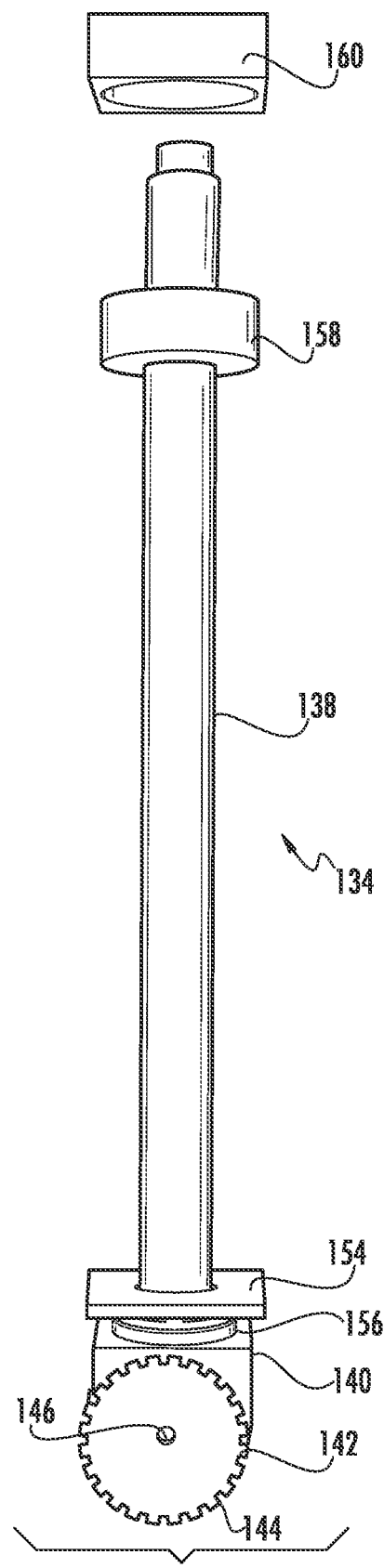
Figure 6:
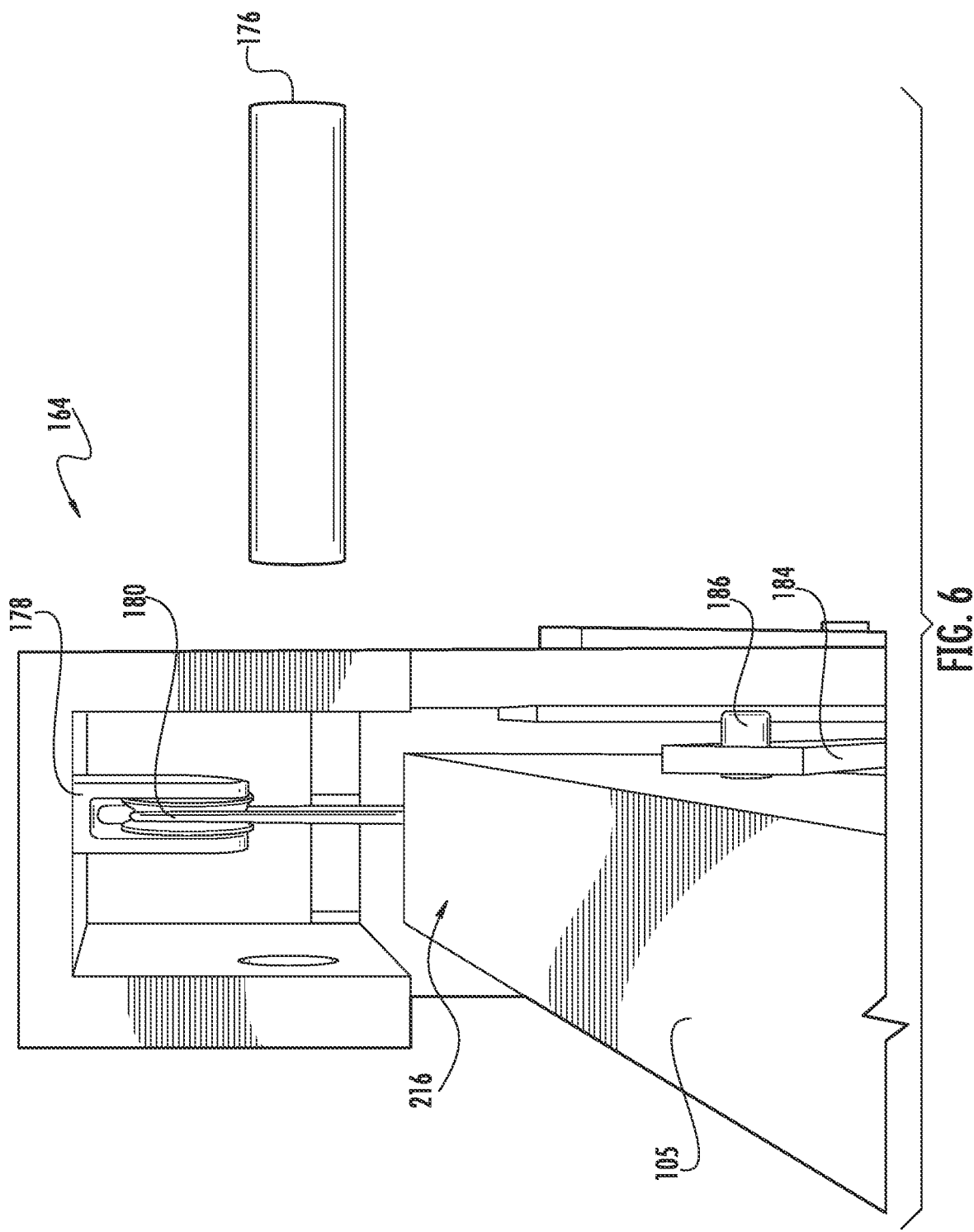
Figure 7:
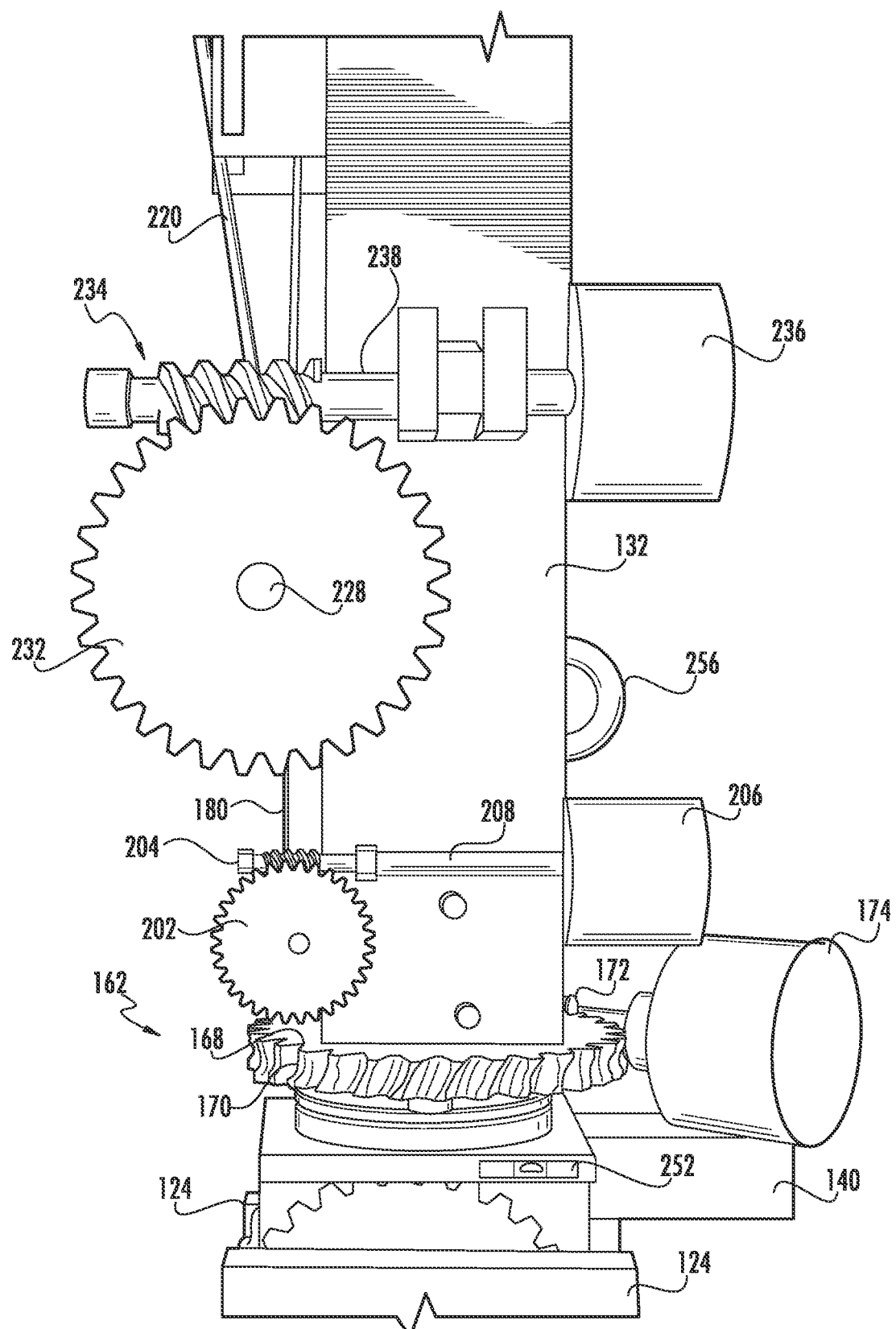
Figure 8:
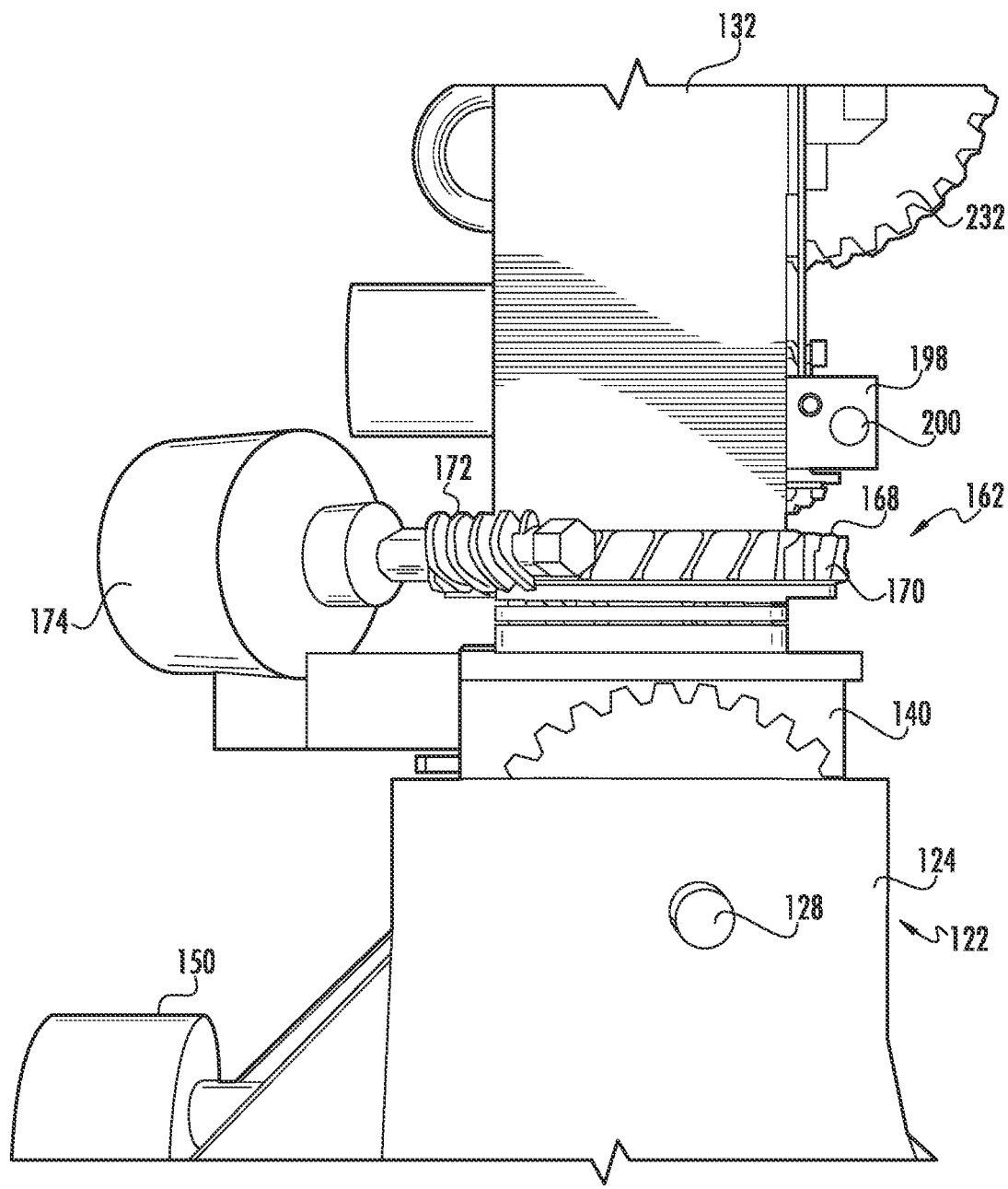
Figure 9:
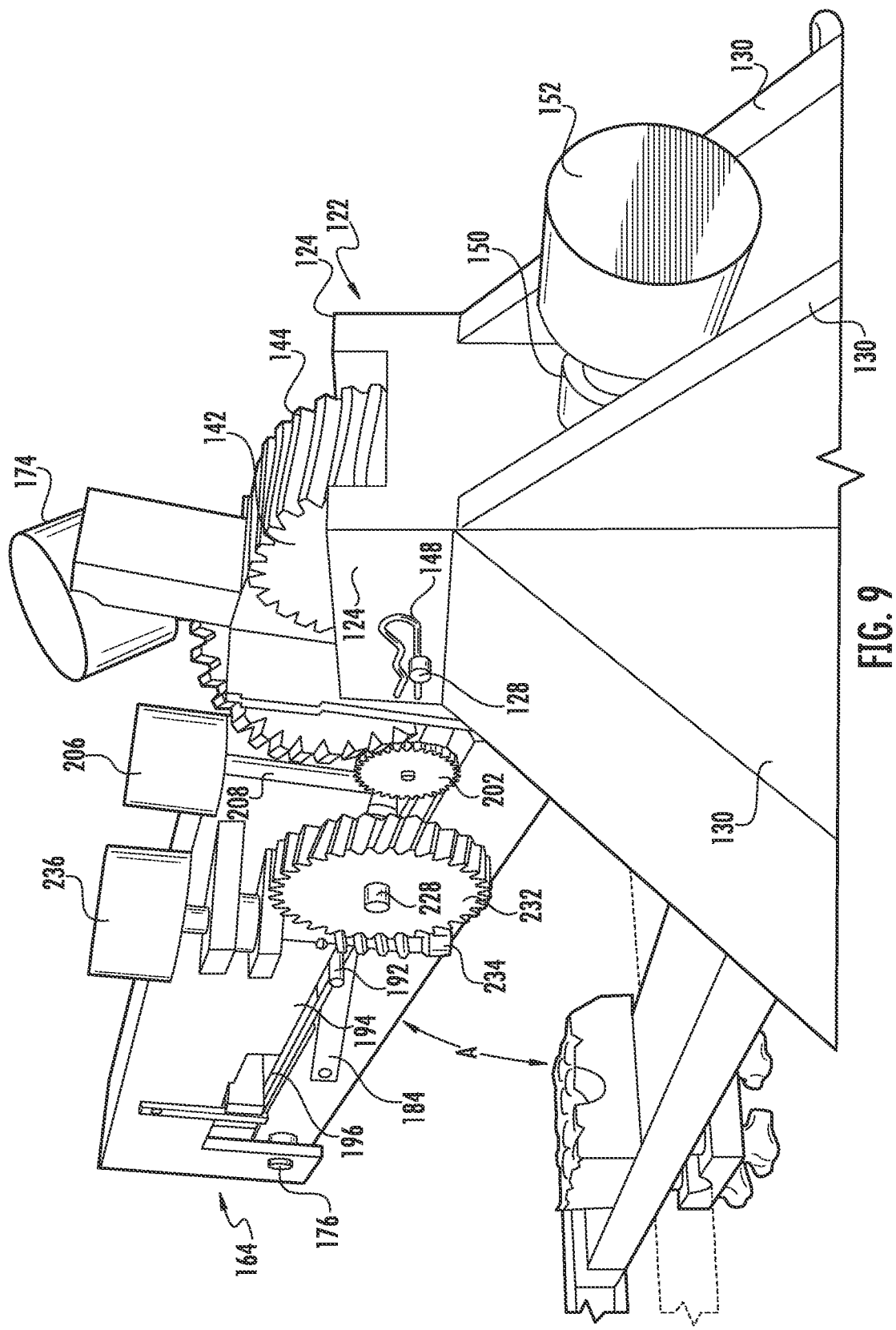
Figure 10:
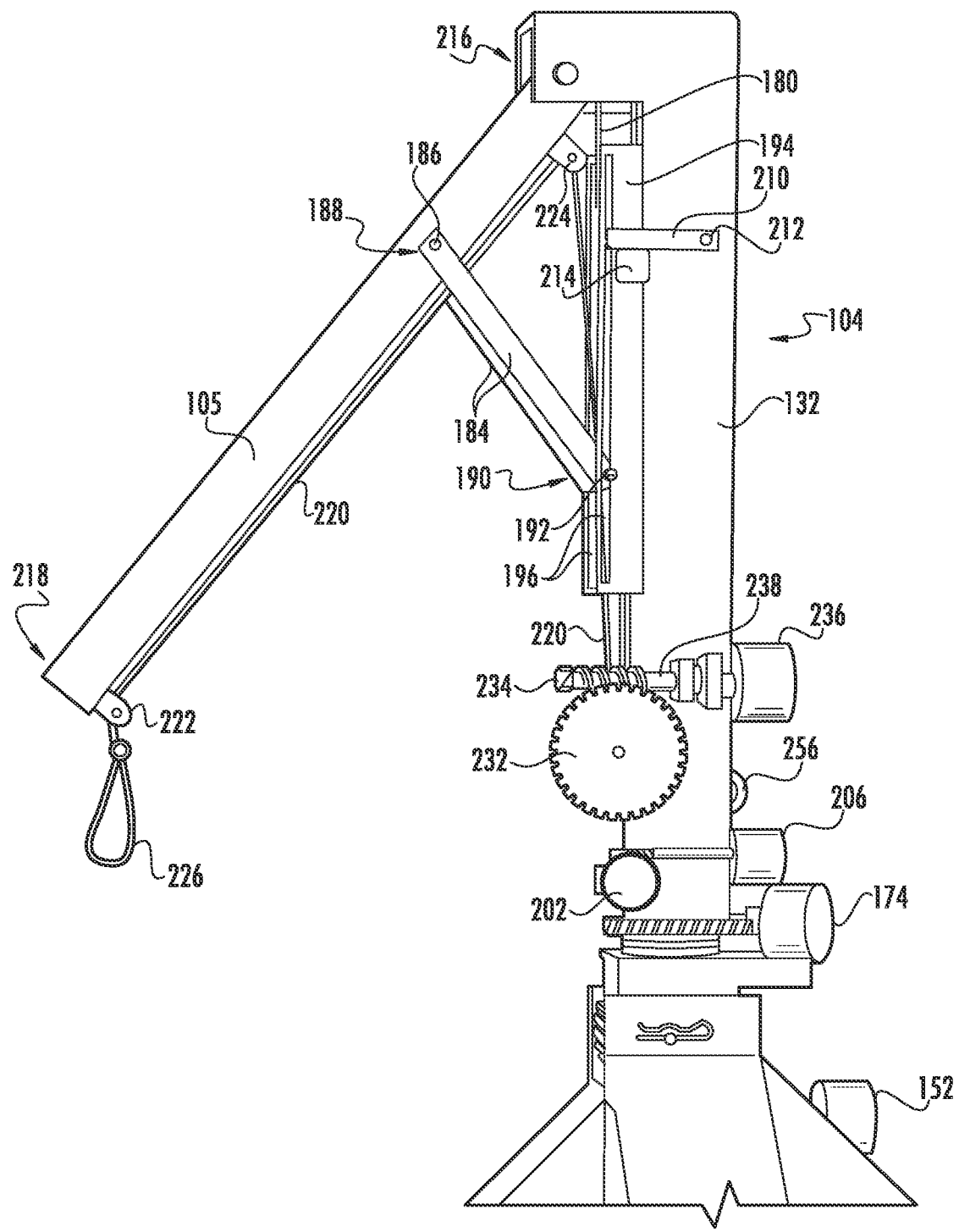
Figure 11:
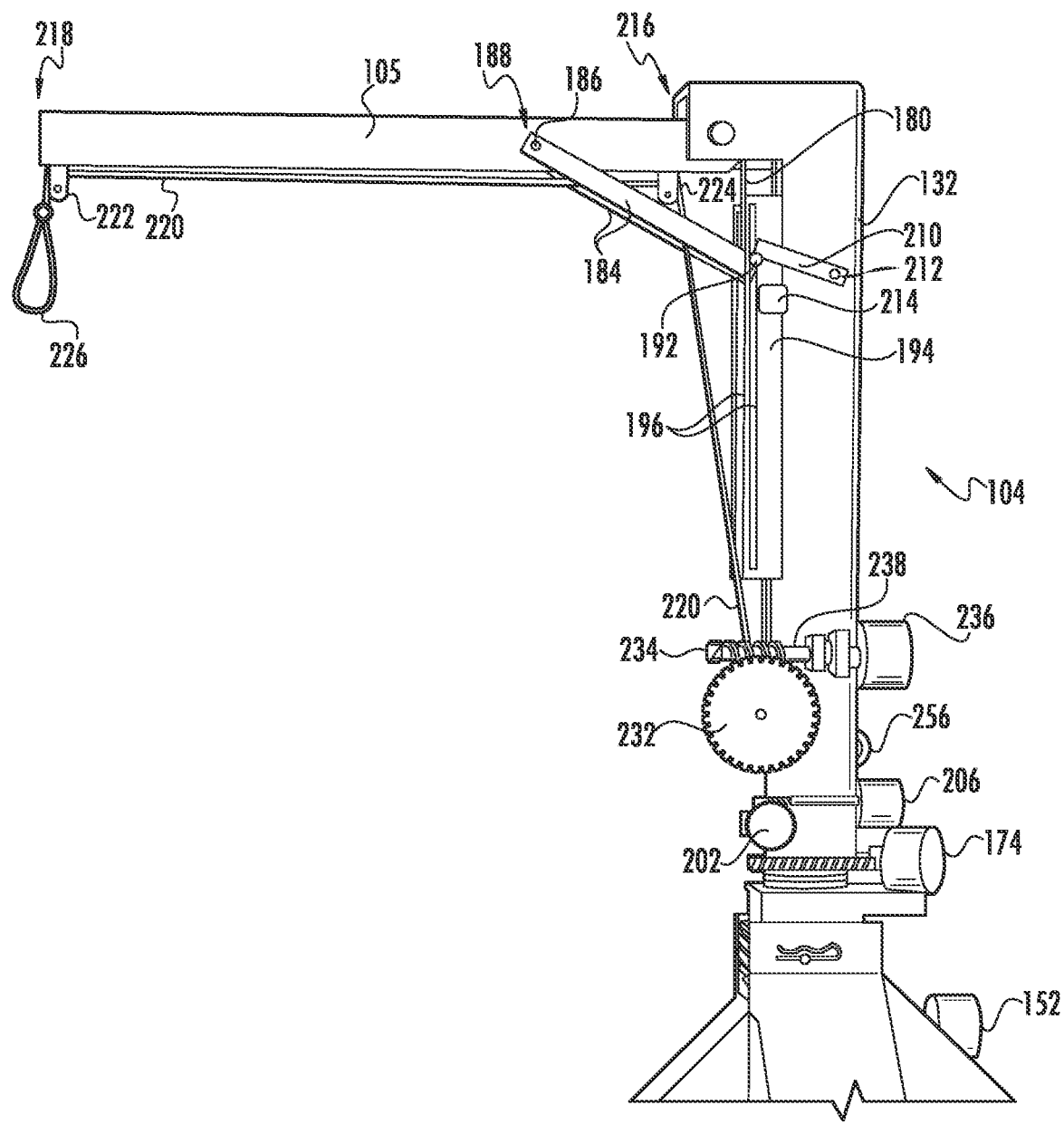
Figure 12:
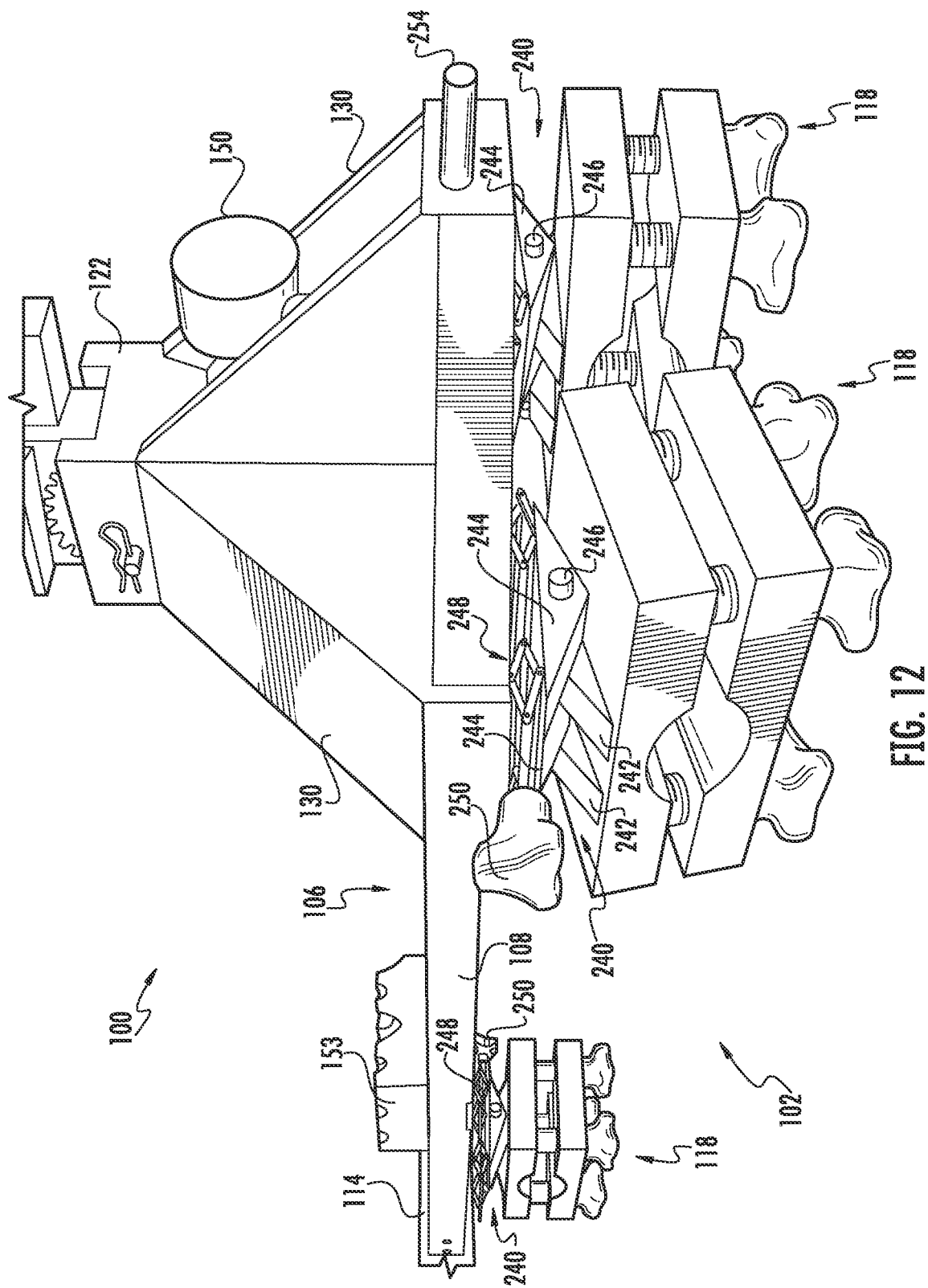
Figure 13:
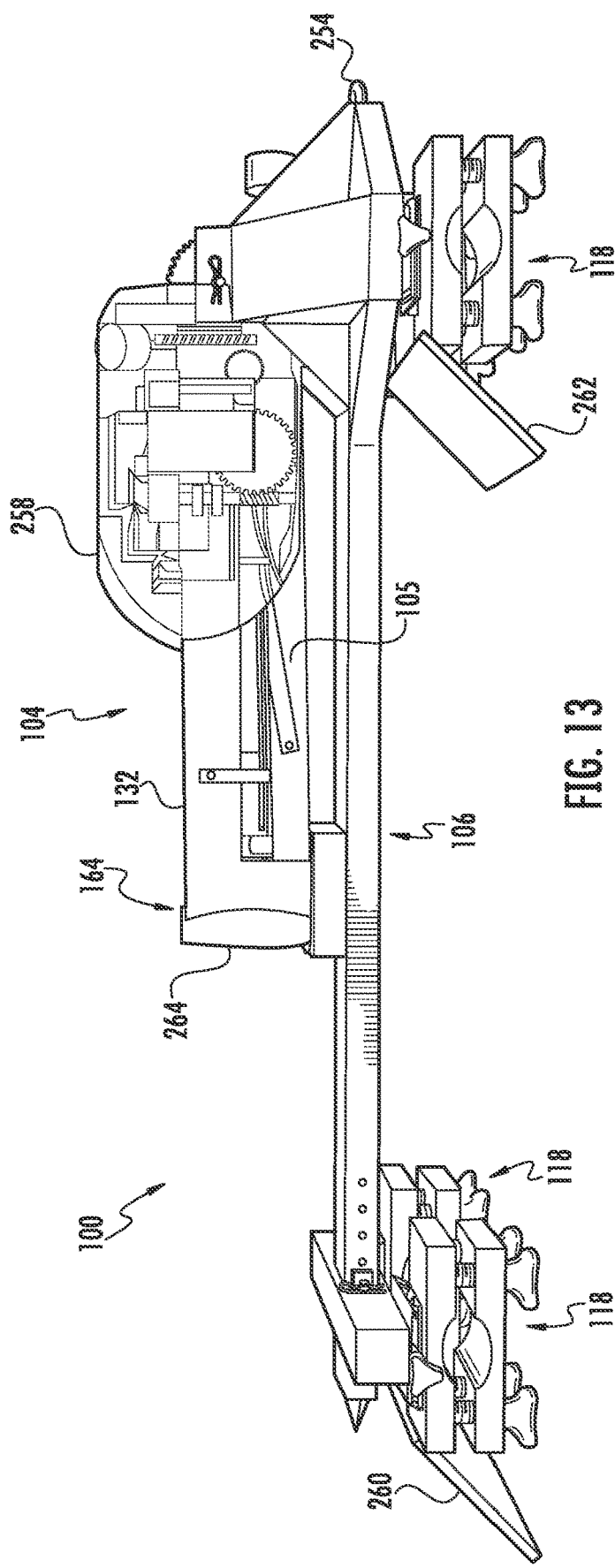
Figure 14:
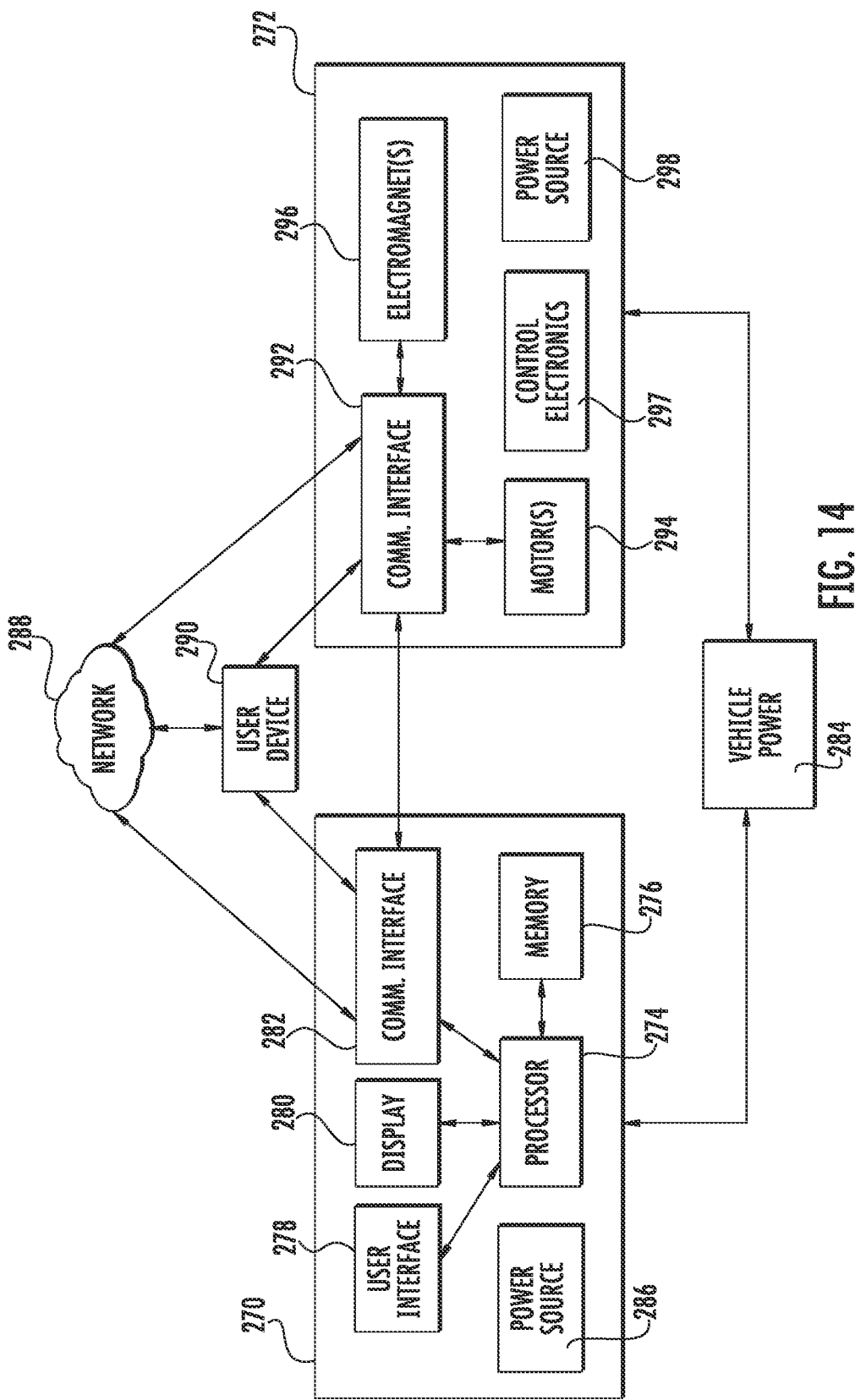
Figure 15:
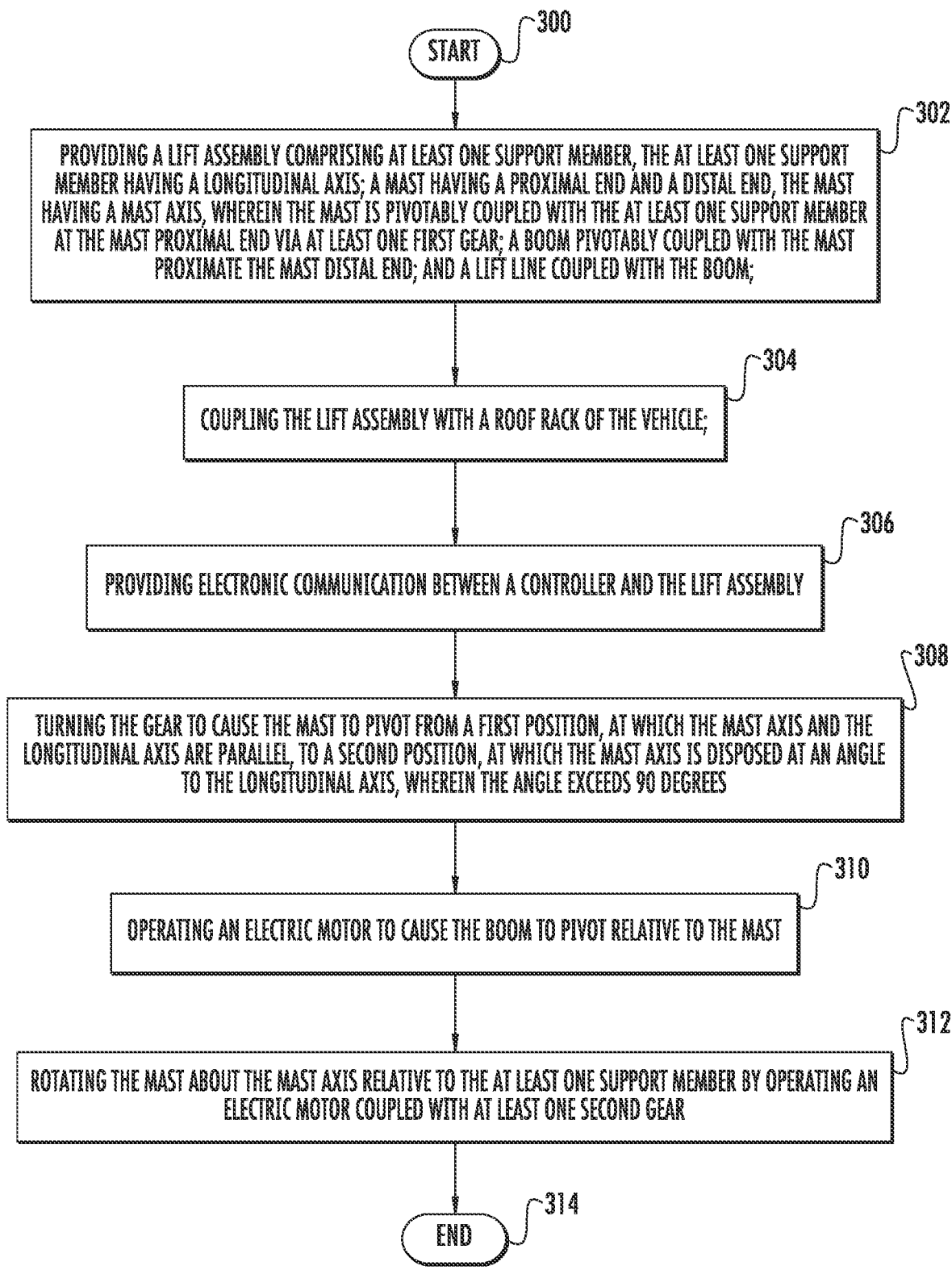
Figure 16:
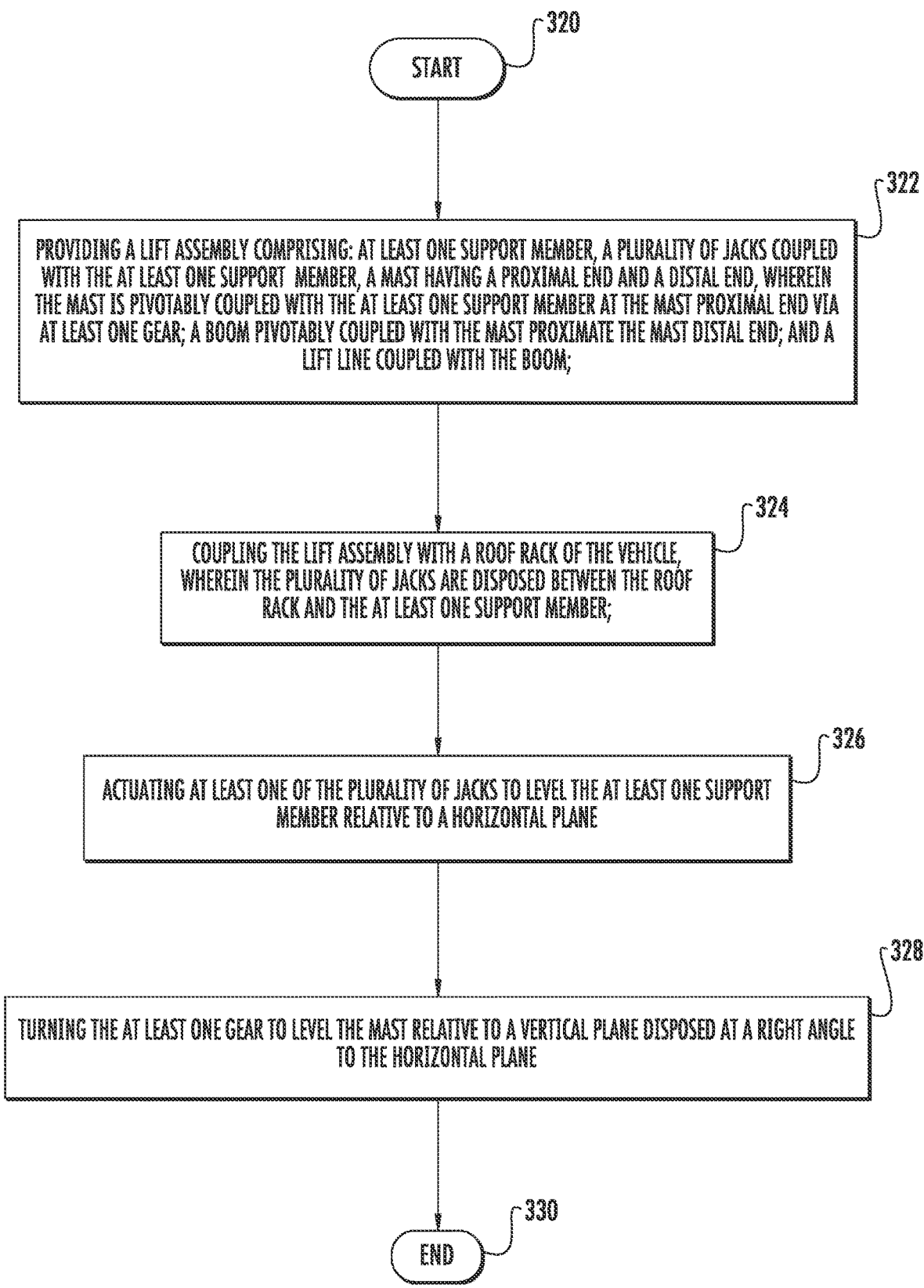

Having thus described some example embodiments in general terms, reference will now be made to the accompanying drawings, which are not necessarily drawn to scale, and wherein:

FIG. 1 is a perspective view of a lift assembly being used to lift an object onto the roof of a vehicle in accordance with an embodiment of the present invention;

FIG. 2 is a perspective view of a lift assembly in accordance with an embodiment of the invention wherein both the mast and the boom are in a raised position;

FIG. 3 is a partially exploded view of the lift assembly of FIG. 2, wherein both the mast and the boom are in a lowered position;

FIG. 4 is a partially exploded view of the lift assembly of FIG. 2 in accordance with an embodiment of the present invention;

FIG. 5 is a partially exploded side elevation view of a mast assembly in accordance with an embodiment of the present invention;

FIG. 6 is a partially exploded perspective view of a distal end of a mast assembly in accordance with an embodiment of the present invention;

FIG. 7 is a left side detail view of a proximal end of the mast of the lift assembly of FIG. 2 in accordance with an embodiment of the present invention;

FIG. 8 is a right side detail view of a proximal end of the mast of the lift assembly of FIG. 2 in accordance with an embodiment of the present invention;

FIG. 9 is a rear perspective view of the lift assembly of FIG. 2 wherein the mast is in a partially raised position and the boom has not been raised;

FIG. 10 is a detail side view of the lift assembly of FIG. 2 wherein the mast is in a raised position and the boom has been raised to a first position;

FIG. 11 is a detail side view of the lift assembly of FIG. 2 wherein the mast is in a raised position and the boom has been raised to a second position, wherein and end of a support strut is in engagement with a latch pin in accordance with an embodiment of the present invention;

FIG. 12 is a detail perspective view of a base assembly of the lift assembly of FIG. 2 in accordance with an embodiment of the present invention, wherein a clamp has been pivoted about a hinge;

FIG. 13 is a left side elevation view of a lift assembly in accordance with another embodiment of the present invention;

FIG. 14 is a block diagram of a control device in electronic communication with a lift assembly in accordance with an embodiment of the present invention;

FIG. 15 is a flow chart illustrating operations in a method of operating a lift assembly in accordance with an embodiment of the present invention; and FIG. 16 is a flow chart illustrating operations in a method of operating a lift assembly in accordance with another embodiment of the present invention.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Further, either of the terms "or" and "one of ___ and ___," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

As noted above, embodiments of the present invention comprise a lift assembly that may be coupled with a roof of a vehicle. Certain embodiments are described below in the context of a lift assembly that is attachable to a passenger car or SUV, but those of skill in the art will appreciate that the present invention is not so limited. For instance, as used herein, the term vehicle refers to any wheeled transport device, including, but not limited to, cars, vans, SUVs, and trucks. Likewise, in various embodiments, a lift assembly according to the present invention may be coupled with a roof rack of a vehicle (e.g., to side rails extending parallel with the vehicle's longitudinal axis and/or to transverse cross-members extending perpendicularly to the side rails), but this is not required in all embodiments. Indeed, in various embodiments the lift assembly may be coupled directly or indirectly with a vehicle's roof, and it also could be coupled with a truck's bed, for example.

Turning first to FIG. 1, illustrated is a lift assembly 10 coupled with a roof 12 of a vehicle 14. A user 16 is shown operating a control device 18 to actuate the lift assembly 10 to lift an object 20, in this case a kayak, onto the roof 12 of vehicle 14, in this case an SUV. As will be discussed in more detail herein, lift assembly 10 may be operable electronically and/or automatically in some embodiments, and thus user 16 need not be able to reach lift assembly 10 or roof 12 to manually actuate the lift assembly 10 in such embodiments. Likewise, it is not required in various embodiments that user 16 have the physical strength to lift object 20 by herself in order to cause object 20 to be raised onto and lowered from roof 12 of vehicle 14. Additionally, even though vehicle 14 is disposed on a non-level surface (e.g., sand 22), as described herein, in various embodiments user 16 may level a mast and boom of the lift assembly 10 vertically and horizontally to ensure that a boom of the lift assembly 10 swings safely and predictably.

Additional detail regarding various embodiments of a lift assembly 100 is provided with reference to FIGS. 2-3. FIG. 2 is a perspective view of lift assembly 100 in accordance with an embodiment of the invention. FIG. 3 is a partially exploded view of lift assembly 100. In general, lift assembly 100 may comprise a base assembly 102 and a mast assembly 104. As described in greater detail below, mast assembly 104 may be pivotably coupled with base assembly 102, such that mast assembly 104 may be pivoted manually or automatically relative to base assembly 102. Additionally, and also as described in more detail below, a boom 105 may be pivotably coupled with mast assembly 104.

Base assembly 102 comprises at least one support member 106 which may be coupled with a vehicle as described herein. In other embodiments, more than one support member 106 may be provided. As shown, the at least one support member 106 comprises a longitudinal bar 108 that extends from a platform 110. The at least one support member 106 may have a longitudinal axis 112 (FIG. 3). Additionally, in this embodiment the at least support member 106 comprises a transverse bar 114 that is slidably disposed on longitudinal bar 108. Accordingly, transverse bar 114 may be slid along longitudinal bar 108 and fixed in a desired position via a pin or the like disposed in one of a plurality of apertures 116 (FIG. 3). Although longitudinal bar 108 and transverse bar 114 are shown as generally square in cross-section, it will be appreciated that these components may have any suitable cross-section. In various embodiments, at least one support member 106, including longitudinal bar 108, platform 110, and transverse bar 114, may be formed from a suitable high-strength material, such as metal.

Embodiments of the present invention contemplate that lift assembly 100 may be coupled with a vehicle's roof directly or indirectly (e.g., via a roof rack), and it is contemplated that such coupling may occur in any known manner. In the illustrated embodiment, a plurality of clamps 118 are coupled with the at least one support member 106. In particular, two clamps 118 are coupled with transverse bar 114, and two clamps 118 are coupled with platform 110, though in other embodiments more or fewer clamps could be provided. As those of skill in the art will appreciate, clamps 118 may be used to couple support member 106 with a roof rack of a vehicle. For example, as is seen in FIG. 2, clamps 118 may be disposed on bars 120 of a roof rack disposed on a vehicle's roof (not shown). It is contemplated that, in various embodiments, bars 120 could be oriented transverse to a vehicle or longitudinal therewith, and lift assembly 100 may be mounted facing any suitable direction relative to the vehicle. It is further contemplated that, in some embodiments, lift assembly 100 may be coupled with only one bar 120 of a roof rack having multiple bars 120.

By virtue of the slidable coupling between transverse bar 114 and longitudinal bar 108, support member 106 (and thus, lift assembly 100) may be adjusted to accommodate and couple with various types of vehicles having roof racks of different sizes and configurations. Likewise, clamps 118 preferably may be loosened to allow lift assembly 100 to slide along the length of bars 120 and tightened about bars 120 to secure lift assembly 100 in a desired position. Further, use of clamps 118 as a mechanism for coupling lift assembly 110 with bars 120 of a roof rack causes support member 106 to be disposed above bars 120, which may place less stress on support member 106 and/or clamps 118, in part because they are not under stress from gravity. This may reduce the risk of material fatigue and/or structural failure associated with either the lift assembly 100 or the roof rack bars 120, or both. Additionally, use of clamps 118, which may be formed from a suitable metal material in some embodiments, prevents fraying, burning, and tearing and may reduce the likelihood of wear, accidents, and/or tampering as compared with other connection methods. Certain additional details regarding clamps 118, the connection between lift assembly 100 and a vehicle roof, and the adjustability of lift assembly 100 are provided below with reference to FIG. 12.

Base assembly 102 may also comprise a bracket 122 that is supported on platform 110. Bracket 122 may be formed of a suitable metal material in various embodiments. In various embodiments, mast assembly 104 may be coupled with base assembly 102 via bracket 122. Although a variety of suitable brackets may be used in various embodiments, in one embodiment bracket 122 may comprise a pair of laterally opposed flanges 124 through each of which an aperture 126 extends. Apertures 126 in each flange 124 may be in concentric alignment such that a pin 128 (see FIGS. 8-9) or another suitable fastener may pass therethrough. Between flanges 124, bracket 122 may define a partially open area sized to receive a lower portion of mast assembly 104 therein. In particular, in one embodiment, a gear arrangement may be disposed within the partially open area between flanges 124, as described in more detail below.

In various embodiments, the connection between mast assembly 104 and base assembly 102 may be reinforced to reduce the risk of bending stresses. For instance, as shown, bracket 122 may be supported on each of four sides by a brace 130. In this embodiment, braces 130 may be formed right-triangular solids, but in other embodiments other suitable reinforcements may be used. In some embodiments, to further enhance strength in the highest stress areas, portions of the support member 106 (e.g., bar 108, platform 110, bracket 122, and braces 130) may be formed (e.g., by molding) as a unitary solid. In other embodiments, bar 108 and platform 110 may be a unitary solid piece, and bracket 122 and braces 130 may be attached to platform 110 via welding.

Additionally, the robustness of lift assembly 100 may be enhanced by the placement of bracket 122 and mast assembly 104 relative to the at least one support member 106. More particularly, and as best seen in FIG. 2, in one embodiment bracket 122 may be disposed on platform 110 in a location that aligns bracket 122 with clamps 118 in the direction of the bar 120 to which clamps 118 are attached. In other words, in this embodiment, bracket 122 (and when raised as shown in FIG. 2, mast assembly 104) may be disposed directly above bar 120 when clamps 118 are attached to bar 120. As a result, the mast assembly 104 and bracket 122 are located such that they reduce or eliminate application of a bending moment to platform 110 (e.g., at the location of attachment of clamps 118) during use of lift assembly 110. Again, this may reduce the risk of failure.

Referring now also to FIGS. 4-5, which are partially exploded views of lift assembly 100 and mast assembly 104, in one embodiment, mast assembly 104 may comprise a tube 132 coupled with an inner support assembly 134. As shown in FIG. 3, mast assembly 104 may define a mast axis 136 which extends in a generally longitudinal direction along the length of tube 132. Tube 132 may be a hollow length of metal tubing having a rectangular cross-section, but embodiments of the invention are not limited to any particular tube 132 cross-sectional shape.

In various embodiments, inner support assembly 134 may comprise a gear or gear portion configured to mate with a complementary gear that is coupled with support member 106. Thus, in various embodiments, the complementary gear coupled with support member 106 may be manually or automatically actuated to cause movement of the gear or gear portion of inner support assembly 134, and thereby to pivot mast assembly 104. In the embodiment shown, inner support assembly 134 may comprise a rod 138 that projects from a block 140 disposed at a proximal end of rod 138. Block 140 may comprise a curved surface 142 on which a plurality of gear teeth 144 are disposed (see FIGS. 2, 5, & 9). In other embodiments, a gear or gear portion could be welded or otherwise attached with block 140. An aperture 146 may also be defined in block 140. Mast axis 136 may be collinear with the longitudinal axis of rod 138 in some embodiments. In some embodiments, rod 138 need not be provided at all.

Inner support assembly 134 may be coupled with support member 106 by placing block 140 in the space between flanges 124, aligning aperture 146 with apertures 126, and passing pin 128 through apertures 126, 146. A clevis clip 148 (FIG. 9) may be used to secure pin 128 in place. As noted above, a gear configured to mate with gear teeth 144 may be coupled with support member 106. In the embodiment shown, a worm 150 may be rotatably coupled with bracket 122 and extend into the open space defined between flanges 124. Worm 150 can be located in bracket 122 such that its gear teeth mate with gear teeth 144. In various embodiments, worm 150 may be manually or automatically actuated. As shown, a motor (e.g., an electric DC motor) 152 may be operative to rotate a shaft connected with worm 150 and configured to cause rotation thereof. In another embodiment, motor 152 may be replaced with a manually-operated knob, crank, or winch. in various embodiments, provision of a worm gear arrangement to move mast assembly 104 into position may enhance the safety of lift assembly 100. For example, the worm gear arrangement may act as a brake, or prevent movement of mast assembly 104 relative to support member 106, in the event of a power failure (such as motor 152 failing or, where non-electronic components are used to move mast assembly 104, in the event of fatigue on the part of a user).

In any event, in the illustrated embodiment, actuation of motor 152 rotates worm 150, which engages gear teeth 144 to cause pivotal movement of mast assembly 104 relative to support member 106 through an angular displacement A (see FIG. 9) about the axis of pin 128. Thereby, mast assembly 104 may be moved from a lowered, or stored, position (see FIGS. 3, 13) to a raised, or working, position (see FIGS. 2, 10-11) and vice versa. In some embodiments, when mast assembly 104 is in the lowered, or stored, position shown in FIGS. 3 and 13, it may rest on a support member 153, which in some embodiments may comprise a flexible or cushion material, such as but not limited to a foam.

In various embodiments, angular displacement A may be between about 0 degrees and 135 degrees, though in some embodiments angular displacement A could be between about 0 degrees and 180 degrees. Because angular displacement A is greater than 90 degrees in some, but not all, embodiments, mast assembly 104 may be leveled with respect to a vertical plane even where support member 106 or the vehicle to which it may be attached is not level (or cannot be leveled) with respect to a horizontal plane. This may allow boom 105 to swing in a level plane, which may enhance the safety and operability of lift assembly 100. In some other embodiments, and particularly where it is possible to level support member 106 with respect to a horizontal plane (as discussed elsewhere herein), angular displacement A may not be greater than 90 degrees. In some cases, however, it may not be possible to fully level support member 106, for instance depending on the amount by which support member 106 may be adjustable and the steepness of the surface on which the vehicle is parked, and thus the option of an angular displacement A greater than 90 degrees may be desirable.

In one embodiment, tube 132 may be coupled with inner support assembly 134 and operative to rotate relative thereto. In this regard, a flange 154 sized to support tube 132 may be coupled for rotation with an annular bearing 156 (e.g., a thrust-type roller bearing, a slewing bearing, or another suitable bearing arrangement), and the flange 154 and bearing 156 may be received over rod 138 such that bearing 156 and flange 154 rest on block 140 at a proximal end of rod 138. Also, a bearing 158 may be coupled with rod 138 proximate its distal end, for example by press fit. Bearing 158 may be a needle-type roller bearing in some embodiments. A flange 160, which may be shaped to fit snugly within the interior of tube 132, may be received over and coupled with bearing 158.

Tube 132 may have a proximal end 162 and a distal end 164. In general, tube 132 may be received over rod 138, bearing 158, and flange 160 such that distal end 164 of tube 132 rests on flange 154. By virtue of flange 160, bearing 158, and bearing 156, tube 132 may be rotatable about the longitudinal axis of rod 138. Tube 132 may be secured to rod 138 at their respective distal ends, for example using a clevis pin or another suitable fastener, to prevent longitudinal movement of tube 132 relative to rod 138.

In one embodiment, tube 132 is rotatable manually by a user, for example using a pole 166 (FIG. 1). Pole 166 may be used to push or pull an object being lifted or lowered by lift assembly 100, which may cause corresponding rotation of tube 132 about its axis. In another embodiment, and with reference to FIGS. 7-8, tube 132 is automatically rotatable. For example, as shown, distal end 164 of tube 132 may define a gear, or an annular flange 168 having a plurality of gear teeth 170 disposed on its periphery. A worm 172 may be in mating engagement with gear teeth 170 on flange 168, and a motor (e.g., an electric DC motor) 174 coupled with worm 172 may be coupled with block 140. Motor 174 may be operative to rotate worm 172 to cause rotation of tube 132. In still other embodiments, motor 174 can be replaced with a manual crank, knob, or winch. Again, in various embodiments, provision of a worm gear arrangement may enhance the safety of lift assembly 100. For example, the worm gear arrangement may prevent rotation of tube 132 to an undesired location in the event of power failure (or, where a manual crank, knob, winch, or the like is used instead of motor 174, in the event of fatigue of the user).

FIG. 6 is a partially exploded perspective view of distal end 164 of tube 132. In this embodiment, boom 105 of lift assembly 100 may be pivotably coupled with tube 132 via a pin 176. Additionally, a pulley 178 may be coupled with an interior portion of distal end 164 of tube 132, though which a boom lift wire 180 may be routed. Boom lift wire 180 may be formed of any suitable material, including polymeric materials (e.g., nylon cord or rope) or metals. As described in greater detail herein, via a pulling force applied to boom lift wire 180, boom 105 may be pivoted about the axis of pin 176 from a stored, or lowered position (see FIGS. 3, 9) to a working, or raised position (see FIGS. 2, 4, 11). In various embodiments, when the boom 105 is in a stowed or lowered position relative to the mast assembly 104 (e.g., FIGS. 3, 9), and when the mast assembly 104 is in a stored or lowered position relative to the at least one support member 106 (e.g., FIGS. 3, 13), the mast axis 136 and the longitudinal axis 112 of the at least one support member 106 may extend along parallel planes. In some embodiments, the axes 112, 136 also may be parallel.

Operation of boom 105 will be described in greater detail with reference to FIGS. 2-4 and 6-11. In particular, in various embodiments, at least one strut may be pivotably connected with boom 105 and slidably coupled with mast assembly 104. In the illustrated embodiment, two struts 184 are pivotably coupled on laterally opposed faces of boom 105, for example via pins 186 (see FIGS. 6, 10-11). Each strut 184 may have a first end 188, which may be pivotably connected with boom 105, and an opposite second end 190, which may be slidably connected with mast assembly 104.

In this regard, as best seen in FIGS. 2 and 9, in one embodiment the second ends 190 of struts 184 may be coupled with a rod 192. Rod 192 may be sized to extend laterally beyond each side of each strut 184. Also in this embodiment, mast assembly 104 may comprise a track 194 to facilitate slidable movement of struts 184. More specifically, and as best seen in FIGS. 9-11, track 194 may comprise two flanges which project from tube 132, for example in a direction that is parallel with a plane in which boom 105 pivots. Each flange of track 194 may define a longitudinal slot 196, for example which extends vertically in a direction parallel with mast axis 136. The flanges of track 194 may be laterally spaced such that the distal ends 190 of struts 184 may each be disposed laterally to the inside of each flange of track 194. Thereby, the portions of rod 192 that project laterally on either side of distal ends 190 of struts 184 may be respectively received within each slot 196. Accordingly, via rod 192, distal end 190 of struts 184 may slide along slots 196 of track 194.

Next, with reference to FIGS. 2 and 7-11, mast assembly 104 may comprise a gear arrangement operative to raise and lower boom 105. For example, in one embodiment, a second pair of flanges 198 may project from tube 132 proximate its proximal end 162. A rod 200 may extend between and be rotatable with respect to flanges 198. A gear 202 may be coupled with one end of rod 200, and a complementary gear (e.g. a worm 204) may be in mating engagement with gear 202. This gear arrangement may be manually or automatically actuated in various embodiments. In the illustrated embodiment, a motor (e.g., an electric DC motor) 206 may be operative to rotate a shaft 208 that is coupled with worm 204. Operation of motor 206 causes rotation of shaft 208, worm 204, gear 202, and rod 200. (As noted above, in other embodiments, motor 206 may instead be replaced with manually-actuated knobs or winches.) One end of boom lift wire 180 may be coupled with rod 200, and the opposite end of boom lift wire 180 may be coupled with rod 192. As gear 202 and rod 200 are rotated, boom lift wire 180 may be wound and unwound from rod 200, causing corresponding upward and downward movement of rod 192 in slots 196 of track 194. For example, as boom lift wire 180 is wound around rod 200, boom lift wire 180 is effectively shortened, and a pulling force is applied via boom lift wire 180 to rod 192, causing the second end 190 of struts 184 to move upward. As second end 190 of struts 184 move upward along slots 196, first end 188 of struts 184 applies a lifting force to boom 105 (see FIGS. 9-11). Again, in various embodiments, provision of a worm gear arrangement may enhance the safety of lift assembly 100. For example, the worm gear arrangement may act as a brake to prevent lowering of struts 184 and/or boom 105 in the event of power failure (or, where a manual crank, knob, winch, or the like is used instead of motor 206, in the event of fatigue of the user).

Referring now to FIGS. 2 and 10-11, in various embodiments, lift assembly 100 may comprise a locking mechanism that operates to prevent boom 105 from being lowered after it has been moved to the working, or raised, position. In one embodiment, mast assembly 104 may comprise at least one locking bar 210 pivotably coupled with tube 132. As shown, two such locking bars 210 may be provided to cooperate with the opposing ends of rod 192 that project beyond either side of struts 184, as described herein. Locking bars 192 may be pivotable about the axis of a pin 212 or the like and may normally rest in a horizontal position on blocks 214 coupled with the flanges of track 194 (see FIG. 10). However, as boom 105 is extended and the second end 190 of struts 184 move upward in slots 196 of track 194, the ends of rod 192 may come into engagement with respective locking bars 210 (see FIG. 11). As boom 105 and struts 184 continue to travel upward, rod 192 may move locking bars 210 upward about the axis of pin 212. Eventually, rod 192 will have moved beyond locking bars 210, and locking bars 210 may return (e.g., under the force of gravity or via a spring-bias mechanism) to the horizontal position shown in FIG. 10. Boom lift wire 180 may then be unwound slightly to allow boom 105 to lower and rod 192 to come to rest on locking bars 210. As a result, boom 105 will be held in the working, or raised, position. This may be particularly useful where the weight of an object to be lifted via boom 105 were greater than the weight boom lift wire 180, motor 206, or gears 202, 204 are able to support or maintain.

To allow boom 105 to be moved to the stowed, or lowered, position, second ends 190 of struts 184 and rod 192 must be raised upward (e.g., by motor 206 rotating worm 204 and gear 2020 to cause boom lift wire 180 to be further wound on rod 200), and locking bars 210 must be moved out of the path of travel of rod 192 in slots 196 of track 194. In various embodiments, locking bars 210 may be or have an end that has magnets of one polarity, and locking bars 210 may be pivoted upward about the axis of pin 212 in response to repulsion force against the magnets by an electromagnet having the opposite polarity. For example, blocks 214 could comprise such electromagnets in some embodiments. Those of skill in the art will appreciate, thought, that other mechanisms may be used to cause pivotal movement of locking bars 210. Among other things, for example, locking bars 210 may be pivotable in response to actuation of a solenoid or another gear arrangement could be used. In any event, once locking bars 210 are moved upward out of the path of travel of rod 192 in slots 196, motor 206 may rotate worm 204 and gear 202 to cause boom lift wire 180 to be unwound from rod 200, thereby allowing second ends 190 of struts 184 and rod 192 to travel downward past blocks 214 and toward the lower end of track 194.

Referring now to FIGS. 2, 4, and 10-11, boom 105 may be formed of a suitable high-strength material, such as metal, in various embodiments, and it may comprise an elongate member having a proximal end 216 and a distal end 218. As shown, boom 105 may comprise a length of hollow rectangular metal tubing. However, boom 105 may be formed of other suitable materials and have a cross-section of any suitable shape in other embodiments. As noted above, boom 105 may be pivotably connected with tube 132 via pin 176 at the proximal end 216 of boom 105.

In various embodiments, boom 105 may carry or support a main lift wire 220. Main lift wire 220 may be formed of any suitable material familiar to those of skill in the art for lifting and lowering various heavy objects, including metal cables, chains, or high-tensile strength rope, among others. As those of skill in the art will appreciate, the characteristics of main lift wire 220 may vary, as needed or desired, depending on the intended use of lift assembly 100. More particularly, boom 105 may comprise a first pulley 222 depending from distal end 218 and a second pulley 224 depending from boom 105 near the proximal end of boom 105. One end of main lift wire 220 may be attached to a coupling mechanism 226. Any coupling mechanism 226 may be used, as needed or desired for attachment to specific objects, such as but not limited to a carabiner (as shown), hooks, straps, bars, etc.

In this embodiment, main lift wire 220 may be routed through pulleys 222, 224 and extend along the length of boom 105 and down mast assembly 104. The opposite end of main lift wire 220 may be coupled with a rod 228 (FIG. 2). In this regard, a third pair of flanges 230 (one of which is visible in FIG. 2) may project from tube 132, and rod 228 may extend between and be rotatable with respect to flanges 230. A gear 232 may be coupled with one end of rod 228, and a complementary gear (e.g., a worm 234) may be in mating engagement with gear 232. In other embodiments, main lift wire 220 and its associated gear arrangement need not be coupled with mast assembly 104. For instance, in some embodiments, rod 228, flanges 230, gear 232, and worm 234 may be instead coupled with boom 105.

In any event, the gear arrangement may be manually or automatically actuated in various embodiments. In the illustrated embodiment, a motor (e.g., an electric DC motor) 236 may be operative to rotate a shaft 238 that is coupled with worm 234. Operation of motor 236 causes rotation of shaft 238, worm 234, gear 232, and rod 228. (As noted above, in other embodiments, motor 236 may instead be replaced with manually-actuated knobs or winches.) As gear 232 and rod 228 are rotated, main lift wire 220 may be wound and unwound from rod 228, causing corresponding upward and downward movement of coupling mechanism 226 and any object(s) attached thereto. Again, in various embodiments, although any suitable gear arrangement may be used, providing a worm gear arrangement may enhance the safety of lift assembly 100. For example, the worm gear arrangement may act as a brake to prevent lowering of main lift wire 220 and any object(s) attached to coupling mechanism 226 in the event of power failure (or, where a manual crank, knob, winch, or the like is used instead of motor 236, in the event of fatigue of the user).

In some embodiments, the extent to which main lift wire 220 and boom lift wire 180 are wound and/or unwound about rod 228 and rod 200, respectively, may need to be coordinated (either manually or automatically) in order to facilitate raising and/or lowering of mast assembly 104 and/or boom 105. For example, if main lift wire 220 is too tightly wound in some embodiments, it may not be possible to lift boom 105 so that locking bars 210 may be pivoted up and out of the way and so that struts 184 may then be lowered past locking bars 210.

Turning now to FIG. 12, which is a detail perspective view of a base assembly 102 of the lift assembly 100 in accordance with an embodiment of the present invention, in various embodiments, lift assembly 100 may be adjustable in various ways to accommodate vehicles that may be disposed on non-level surfaces and various vehicle roof rack configurations. For instance, in the embodiment shown in FIG. 12, clamps 118 may not be directly attached to support member 106. Instead, hinges 240 may be disposed between clamps 118 and support member 106. Hinges 240 may be any suitable hinge in various embodiments. In the illustrated embodiment, hinges 240 may be simple hinges comprising a pair of spaced apart triangular leaves 242 disposed on a top surface of each clamp 118 and a pair of complementary triangular leaves 244, one of which is disposed between triangular leaves 242 and one of which is disposed laterally outside of one of the triangular leaves 242. In each hinge 240, leaves 242, 244 may be pivotably coupled together via a pin 246.

As a result of including hinges 240, clamps 118 may be pivoted to accommodate non-straight or non-linear vehicle roof rack configurations. In this regard, clamps 118, which are coupled with triangular leaves 242, may pivot with respect to leaves 244. As shown in FIG. 12, for example, the clamp 118 that is in the foreground has been pivoted about the axis of pin 246. Thus, in some embodiments, clamps 118 (or other attachment mechanisms coupled with support member 106 via hinges 240) may be used to couple lift assembly 100 with curved roof racks.

Additionally, while in some embodiments hinges 240 may be coupled directly with support member 106, in other embodiments a jack 248 may be coupled between support member 106 and hinge leaves 244. As used herein, the term jack is inclusive of a variety of lifting mechanisms that are familiar to those of skill in the art, including screw jacks and fluid actuated cylinders (e.g., pneumatic, hydraulic), among others. As shown, for example, jacks 248 may be scissor jacks that are actuatable via knobs 250. As is well understood, knobs 250 may be rotated in one direction to expand jacks 248, thereby lifting support member 106 relative to clamps 118, and in the opposite direction to contract jacks 248, thereby lowering support member 106 relative to clamps 118.

Thus, for example, and in order to ensure that boom 105 swings in a horizontal plane, where the vehicle with which lift assembly 100 is coupled is disposed on a non-level surface, or if the vehicle's roof rack is otherwise not level, jacks 248 may be used to level lift assembly 100 with a horizontal plane and/or a vertical plane. In some embodiments, a bubble level 250 (FIG. 2) may be provided on support member 106 (as shown, e.g., on one of the braces 130) in order to provide a visual indication of levelness to the user. Bubble level 250 may indicate whether lift assembly 100 is level in a horizontal plane. A second bubble level 252 may be disposed on mast assembly 104 (e.g., as shown in FIG. 7, on block 140) to indicate to the user whether mast assembly 104 is level with a vertical plane disposed at a right angle to the horizontal plane. As noted above, independently of the levelness or non-levelness of support member 106, in various embodiments motor 150 may still be actuated to level mast assembly 104 with respect to the vertical plane.

With reference to FIGS. 3-4, 7, 10, and 12-13, in some embodiments, lift assembly 100 may comprise one or more attachment mechanisms for a lock or the like, for example to prevent theft. In this regard, a loop 254 may be disposed on platform 110, and a loop 256 may be disposed on tube 132 in one embodiment. Thereby, a lock may be connected between loops 254, 256 and/or a vehicle or vehicle roof rack to which lift assembly 100 is attached in order to deter or prevent theft.

FIG. 13 is a left side elevation view of lift assembly 100 in accordance with another embodiment of the present invention. In some embodiments, one or more aerodynamic elements may be provided on various portions of lift assembly 100 to reduce drag, create smoother air flow, and reduce noise during travel. For example, a casing 258 (shown transparent in FIG. 13) may be disposed around certain components mounted on tube 132, such as motors, gears, and rods. Additionally fairings 260, 262 may be disposed forward of various clamps 118 in some embodiments. Further, a nose device 264 may be disposed on the distal end 164 of tube 132. Other aerodynamic elements may be provided in other embodiments.

As noted above, in various embodiments it is contemplated that a user may control the operation of various movements and functions associated with a lift assembly. The user may do so using a control device, which may be a remote control, a standalone device that communicates with a user's device, or the user's device itself, among other things. Use of such a control device enables the lift assembly to be used by those with disabilities which may limit reach, strength, or coordination.

In this regard, FIG. 14 is a block diagram of a control device 270 in communication with a lift assembly 272 in accordance with an embodiment of the present invention. Lift assembly 272 may be analogous to lift assembly 100, described above, except as otherwise noted. Control device 270 and lift assembly 272 can include a number of different modules or components, each of which may comprise any device or means embodied in either hardware, software, or a combination of hardware and software, and which are configured to perform one or more corresponding functions. For example, control device 270 may include a processor 274 in electronic communication with a memory 276, a user interface 278, a display 280, and a communication interface 282. Further, control device 270 can be powered via vehicle power 284 in some embodiments, and in some embodiments it may also or alternatively include a power source 286.

Communication interface 282 may be configured to communicate with lift assembly 272 in any of a number of different manners as part of a lift assembly communication system, including, for example, via a network 288 and/or a user device 290. For instance, communications interface 282 can include any of a number of different communication backbones or frameworks, including, for example, Ethernet, the NMEA 2000 framework, GPS, cellular, WiFi, or other suitable networks. Communication between control device 270 and network 288, user device 290, and/or lift assembly 272 may be by any wired or wireless communication methods familiar to those of skill in the art. As noted above, in some embodiments, control device 270 may be the user's device, such as a mobile phone, laptop, or tablet computer, and in such an embodiment, user device 290 may not be provided.

Lift assembly 272 may include a communications interface 292 in electronic communication with one or more motor(s) 294 (e.g., analogous to motors 152, 174, 206 and/or 236) and/or electromagnets 296. In some embodiments, lift assembly 272 may also include control electronics 297 that are in electronic communication with communications interface 292. Likewise, lift assembly 272 can be powered via vehicle power 284 in some embodiments, and in some embodiments it may also or alternatively include a power source 298.

Processor 274 may be any means configured to execute various programmed operations or instructions stored in memory (e.g., memory 276), such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 274 as described herein. Although not required in all embodiments, where provided, control electronics 297 may be analogous to processor 274 in some embodiments, and it may comprise a processor and memory in some embodiments.

Display 280, e.g., a screen, may be configured to display images and may be configured to receive input from a user. Display 280 may be, for example, a conventional LCD, a touch screen display, or any other suitable display known in the art upon which images may be displayed. Thus, in some embodiments, display 280 may be configured to display user interface 278 thereon. In other embodiments, user interface 278 may include one or more buttons operative to receive user input by pressing or deflecting of the buttons.

The memory 276 may include one or more non-transitory storage or memory devices such as, for example, volatile and/or non-volatile memory that may be either fixed or removable. The memory 276 may be configured to store instructions, computer program code, and other data associated with the lift assembly in a non-transitory computer readable medium for use, such as by the processor for enabling the control device 270 to carry out various functions in accordance with example embodiments of the present invention. For example, the memory 276 could be configured to buffer input data for processing by the processor 274. Additionally or alternatively, the memory 276 could be configured to store instructions for execution by the processor 276.

Accordingly, in various embodiments, a user may use control device 270 (e.g., via display 280 and/or user interface 278) to provide instructions regarding the operation of lift assembly 272. Such instructions or functions may be conveyed to processor 274 and sent via communications interface 282, alone or in conjunction with network 288 and/or user device 290, to communications interface 292. Such instructions or functions may then be carried out by various components of lift assembly 272.

For example, the user interface 278 may present various optional commands for selection by a user. Such commands could include, but are not limited to, "move cable," "swing boom," "fold boom," and/or "fold mast." The user interface 278 may further provide buttons for raising and lowering a wire, swinging the boom clockwise or counter-clockwise, and/or unfolding and folding the mast and boom. Additionally, in some embodiments, the user interface 278 may display a power status of the control device 270 and/or the lift assembly 272, and it may also provide an indication of whether one or more elements of lift assembly 272 (e.g., a support member or a mast) are level or not. Finally, in various embodiments, user interface 278 may display various warnings and informational messages to the user.

As discussed herein, various embodiments of the invention may enhance access to and use of lift assembly 100 by users with disabilities or with limited reach, strength, or coordination. For example, various movements of various components of lift assembly 100 described above may be powered via motors coupled with one or more gears or gear arrangements. Among other things, motors may be used to raise and lower main lift wire 220 and boom lift wire 180 (and struts 184 and boom 104), a motor may be used to raise and lower mast assembly 104, and a motor may be used to cause rotation of tube 132 between inboard and outboard positions relative to a vehicle. Also as described herein, operation of the one or more motors may be done via a remote control device, including, for instance, an app on a user's phone or mobile device, which the user may use without the need to physically access or operate the components of lift assembly 100. The remote control device may in some embodiments be powered by the vehicle's battery or could instead be powered by internal storage.

Embodiments of the present invention also provide methods for operating lift assemblies. Various examples of the methods performed in accordance with embodiments of the present invention will now be provided with reference to FIGS. 15-16. The operations illustrated in and described with respect to FIGS. 15-16 may, for example, be performed by, with the assistance of, and/or under the control of one or more of the processor 274, memory 276, communications interface 282, user interface 278, display 280, communications interface 292, motors 294, electromagnet(s) 296, control electronics 297, network 288, user device 290, and/or or another user device.

First, FIG. 15 is a flow chart according to example methods for operating a lift assembly in accordance with an embodiment of the present invention. At operation 300, the process starts. At operation 302, provided is a lift assembly comprising at least one support member, a mast having a proximal end and a distal end, a boom pivotably coupled with the mast proximate the mast distal end, and a lift line coupled with the boom. The at least one support member has a longitudinal axis, and the mast has a mast axis. The mast is pivotably coupled with the at least one support member at the mast proximal end via at least one first gear. At operation 304, the lift assembly is coupled with a roof rack of the vehicle. Next, at operation 308, the at least one first gear is turned to cause the mast to pivot from a first position, at which the mast axis and the longitudinal axis extend along parallel planes, to a second position, at which the mast axis extends along a plane that is disposed at an angle to the plane along which the longitudinal axis extends, wherein the angle exceeds 90 degrees. At operation 310, an electric motor is operated to cause the boom to pivot relative to the mast. At operation 312, the mast is rotated about the mast axis relative to the at least one support member by operating an electric motor coupled with at least one second gear. At operation 314, the process ends.

Next, FIG. 16 is a flow chart according to example methods for operating a lift assembly in accordance with another embodiment of the present invention. The embodiment described with reference to FIG. 16 may be particularly useful where an object is to be loaded onto or unloaded from a vehicle that is disposed on a non-level surface. At operation 320, the process starts. At operation 322, provided is a lift assembly comprising at least one support member, a plurality of jacks coupled with the at least one support member, a mast having a proximal end and a distal end, a boom pivotably coupled with the mast proximate the mast distal end, and a lift line coupled with the boom. The mast is pivotably coupled with the at least one support member at the mast proximal end via at least one gear. At operation 324, the lift assembly is coupled with a roof rack of the vehicle such that the plurality of jacks are disposed between the roof rack and the at least one support member. At operation 326, at least one of the plurality of jacks is actuated to level the at least one support member relative to a horizontal plane. At operation 328, the at least one gear is turned to level the mast relative to a vertical plane disposed at a right angle to the horizontal plane. At operation 330, the process ends.

Based on the foregoing, it will be appreciated that embodiments of the invention provide improved lift assemblies and systems and methods for operating a lifting assembly. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A lift assembly for a vehicle, the lift assembly comprising:
   at least one support member, the support member having a longitudinal axis lying on a plane, the at least one support member configured for attachment to the vehicle;
   a mast having a proximal end and a distal end, the mast having a mast axis, wherein the mast is pivotably coupled with the at least one support member at the mast proximal end;
   at least one gear arrangement coupled between the at least one support member and the mast proximal end;
   wherein the mast is pivotable relative to the at least one support member about an axis parallel with the plane through an angular displacement greater than 90 degrees;
   a boom pivotably coupled with the mast proximate the mast distal end; and
   a first lift line coupled with the boom.

2. The lift assembly of claim 1, wherein the gear arrangement comprises a curved surface disposed at the proximal end of the mast and a plurality of gear teeth disposed on the curved surface, wherein the plurality of gear teeth are in mating engagement with a worm coupled with the at least one support member.

3. The lift assembly of claim 2, wherein the curved surface is provided on a block that is coupled with the at least one support member, and further comprising a rod extending from the block internal to the mast, wherein the mast is rotatable relative to the longitudinal axis of the rod.

4. The lift assembly of claim 1, wherein the gear arrangement is driven by an electric motor in operative electronic communication with a controller.

5. The lift assembly of claim 4, wherein the controller and electric motor are powered by the vehicle.

6. The lift assembly of claim 1, further comprising a support strut having a first end and an opposite second end, wherein the first end is slidably coupled with the mast and the second end is pivotably connected with the boom, and wherein the first end has a path of travel along the mast between a lower position, at which the first end is disposed away from the distal end of the mast, and an upper position, at which the first end is proximate the distal end of the mast.

7. The lift assembly of claim 6, further comprising a second lift line extending from a pin coupled with the support strut first end, through a pulley coupled with the mast proximate the mast distal end, and to a winch coupled with the mast.

8. The lift assembly of claim 7, wherein operation of the winch in a first direction causes the boom to pivot relative to the mast.

9. The lift assembly of claim 6, further comprising at least one stop bar pivotably coupled with the mast, wherein the stop bar is normally biased to a position that prevents translation of the strut first end from the upper position to the lower position, and wherein the stop bar permits translation of the strut first end from the lower position to the upper position.

10. The lift assembly of claim 9, wherein the at least one stop bar is pivotable relative to the mast in response to actuation of an electromagnet.

11. The lift assembly of claim 1, wherein the mast is pivotable relative to the at least one support member about the axis parallel with the plane through an angular displacement of about 135 degrees.

* * * * *